(12) United States Patent
Landis et al.

(10) Patent No.: US 11,445,509 B1
(45) Date of Patent: Sep. 13, 2022

(54) DOWNLINK BEAM MANAGEMENT USING A CONFIGURABLE DEFLECTOR

(71) Applicant: QUALCOMM Incorporated, San Diego, CA (US)

(72) Inventors: Shay Landis, Hod Hasharon (IL); Ran Berliner, Kfar-Aviv (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/245,961

(22) Filed: Apr. 30, 2021

(51) Int. Cl.
  *H04W 72/04* (2009.01)
  *H04L 5/00* (2006.01)
  *H04W 88/04* (2009.01)

(52) U.S. Cl.
  CPC .......... *H04W 72/046* (2013.01); *H04L 5/005* (2013.01); *H04W 72/042* (2013.01); *H04W 72/0413* (2013.01); *H04W 88/04* (2013.01)

(58) Field of Classification Search
  CPC . H04B 7/0617; H04B 7/0619; H04W 72/046; H04W 72/0469
  See application file for complete search history.

(56) References Cited

U.S. PATENT DOCUMENTS

| | | | | |
|---|---|---|---|---|
| 2020/0280127 A1* | 9/2020 | Hormis | .................... | H04B 7/10 |
| 2020/0336168 A1* | 10/2020 | Hormis | .................... | H03L 7/22 |
| 2021/0184351 A1* | 6/2021 | Eleftheriades | ........... | H01Q 9/26 |
| 2021/0344382 A1* | 11/2021 | Choi | ..................... | H04W 16/28 |
| 2022/0085514 A1* | 3/2022 | Enescu | ............. | H01Q 15/0086 |
| 2022/0095319 A1* | 3/2022 | Duan | .................... | G01S 7/0232 |

\* cited by examiner

*Primary Examiner* — Kevin Kim
(74) *Attorney, Agent, or Firm* — Holland & Hart LLP

(57) ABSTRACT

Methods, systems, and devices for wireless communications are described. Generally, the described techniques allow a channel engineering device (CED) to identify a suitable configuration for deflecting downlink transmissions from a base station to a user equipment (UE). The base station may transmit control signaling to the CED indicating multiple configurations for deflecting downlink reference signals from the base station. The base station may then transmit the downlink reference signals to the CED, and the CED may deflect the downlink reference signals using the indicated configurations. The UE may receive the downlink reference signals from the base station via the CED, and the UE may perform measurements on the downlink reference signals. The UE may then report the measurements to the base station, and the base station may indicate a configuration for the CED to use to deflect subsequent transmissions from the base station to the UE based on the measurements.

28 Claims, 22 Drawing Sheets

DOWNLINK BEAM MANAGEMENT USING A CONFIGURABLE DEFLECTOR

FIELD OF TECHNOLOGY

The following relates to wireless communications, including downlink beam management using a configurable deflector.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a base station may transmit downlink data and control information directly to a UE (e.g., using beamforming). In some cases, however, the path between the base station and the UE may be obstructed or blocked, and the likelihood that the UE receives a downlink transmission from the base station may be low.

SUMMARY

The described techniques relate to improved methods, systems, devices, and apparatuses that support downlink beam management using a configurable deflector. Generally, the described techniques allow a channel engineering device (CED) to identify a suitable configuration for deflecting downlink transmissions from a base station to a user equipment (UE). The base station may transmit control signaling to the CED indicating multiple configurations for deflecting downlink reference signals from the base station. The base station may then transmit the downlink reference signals to the CED, and the CED may deflect the downlink reference signals using the indicated configurations. The UE may receive the downlink reference signals from the base station via the CED, and the UE may perform measurements on the downlink reference signals. The UE may then report the measurements to the base station via the CED, and the base station may indicate a configuration for the CED to use to deflect subsequent transmissions from the base station to the UE based on the measurements.

A method of wireless communication at a channel engineering device is described. The method may include receiving, from a base station, control signaling indicating a set of configurations for deflecting a set of downlink reference signal transmissions received from the base station, deflecting each downlink reference signal transmission of the set of downlink reference signal transmissions according to a corresponding configuration of the set of configurations, and receiving, from the base station, an indication of a configuration of the set of configurations for the channel engineering device to use to deflect subsequent transmissions from the base station to a UE based on deflecting each downlink reference signal transmission from the base station.

An apparatus for wireless communication at a channel engineering device is described. The apparatus may include a processor, memory coupled with the processor, and instructions stored in the memory. The instructions may be executable by the processor to cause the apparatus to receive, from a base station, control signaling indicating a set of configurations for deflecting a set of downlink reference signal transmissions received from the base station, deflect each downlink reference signal transmission of the set of downlink reference signal transmissions according to a corresponding configuration of the set of configurations, and receive, from the base station, an indication of a configuration of the set of configurations for the channel engineering device to use to deflect subsequent transmissions from the base station to a UE based on deflecting each downlink reference signal transmission from the base station.

Another apparatus for wireless communication at a channel engineering device is described. The apparatus may include means for receiving, from a base station, control signaling indicating a set of configurations for deflecting a set of downlink reference signal transmissions received from the base station, deflecting each downlink reference signal transmission of the set of downlink reference signal transmissions according to a corresponding configuration of the set of configurations, and receiving, from the base station, an indication of a configuration of the set of configurations for the channel engineering device to use to deflect subsequent transmissions from the base station to a UE based on deflecting each downlink reference signal transmission from the base station.

A non-transitory computer-readable medium storing code for wireless communication at a channel engineering device is described. The code may include instructions executable by a processor to receive, from a base station, control signaling indicating a set of configurations for deflecting a set of downlink reference signal transmissions received from the base station, deflect each downlink reference signal transmission of the set of downlink reference signal transmissions according to a corresponding configuration of the set of configurations, and receive, from the base station, an indication of a configuration of the set of configurations for the channel engineering device to use to deflect subsequent transmissions from the base station to a UE based on deflecting each downlink reference signal transmission from the base station.

Some examples of the method, apparatuses, and non-transitory computer-readable medium described herein may further include operations, features, means, or instructions for receiving a report from the UE indicating the configuration of the set of configurations for the channel engineering device to use to deflect subsequent transmissions from the base station to the UE, and deflecting the report from the UE to the base station, where receiving the indication of the configuration from the base station may be based on deflecting the report from the UE to the base station.

In some examples of the method, apparatuses, and non-transitory computer-readable medium described herein, receiving the report from the UE may include operations, features, means, or instructions for receiving the report from the UE on a resource corresponding to the configuration indicated by the base station for the channel engineering device to use to deflect subsequent transmissions to the UE. In some examples of the method, apparatuses, and non-transitory computer-readable medium described herein, receiving the report from the UE may include operations, features, means, or instructions for receiving the report from the UE on a beam corresponding to the configuration indicated by the base station for the channel engineering device to use to deflect subsequent transmissions to the UE.

Some examples of the method, apparatuses, and non-transitory computer-readable medium described herein may further include operations, features, means, or instructions for receiving the set of downlink reference signal transmissions from the base station on a single beam, where deflecting each downlink reference signal transmission of the set of downlink reference signal transmissions according to a corresponding configuration of the set of configurations includes beam sweeping the set of downlink reference signal transmissions.

In some examples of the method, apparatuses, and non-transitory computer-readable medium described herein, receiving the set of downlink reference signal transmissions from the base station on the single beam may include operations, features, means, or instructions for receiving the set of downlink reference signal transmissions from the base station in consecutive symbols. In some examples of the method, apparatuses, and non-transitory computer-readable medium described herein, each of the set of configurations corresponds to a different angle at which the channel engineering device may be to deflect a downlink reference signal transmission. In some examples of the method, apparatuses, and non-transitory computer-readable medium described herein, the set of downlink reference signal transmissions includes a set of channel state information reference signal transmissions.

A method of wireless communication at a base station is described. The method may include transmitting, to a channel engineering device, control signaling indicating a set of configurations for deflecting a set of downlink reference signal transmissions received from the base station, transmitting, to the channel engineering device, a set of downlink reference signal transmissions based on transmitting the control signaling indicating the set of configurations, and receiving, from the UE, a report indicating a configuration of the set of configurations for the channel engineering device to use to deflect subsequent transmissions from the base station to the UE based on transmitting the set of downlink reference signal transmissions.

An apparatus for wireless communication at a base station is described. The apparatus may include a processor, memory coupled with the processor, and instructions stored in the memory. The instructions may be executable by the processor to cause the apparatus to transmit, to a channel engineering device, control signaling indicating a set of configurations for deflecting a set of downlink reference signal transmissions received from the base station, transmit, to the channel engineering device, a set of downlink reference signal transmissions based on transmitting the control signaling indicating the set of configurations, and receive, from the UE, a report indicating a configuration of the set of configurations for the channel engineering device to use to deflect subsequent transmissions from the base station to the UE based on transmitting the set of downlink reference signal transmissions.

Another apparatus for wireless communication at a base station is described. The apparatus may include means for transmitting, to a channel engineering device, control signaling indicating a set of configurations for deflecting a set of downlink reference signal transmissions received from the base station, transmitting, to the channel engineering device, a set of downlink reference signal transmissions based on transmitting the control signaling indicating the set of configurations, and receiving, from the UE, a report indicating a configuration of the set of configurations for the channel engineering device to use to deflect subsequent transmissions from the base station to the UE based on transmitting the set of downlink reference signal transmissions.

A non-transitory computer-readable medium storing code for wireless communication at a base station is described. The code may include instructions executable by a processor to transmit, to a channel engineering device, control signaling indicating a set of configurations for deflecting a set of downlink reference signal transmissions received from the base station, transmit, to the channel engineering device, a set of downlink reference signal transmissions based on transmitting the control signaling indicating the set of configurations, and receive, from the UE, a report indicating a configuration of the set of configurations for the channel engineering device to use to deflect subsequent transmissions from the base station to the UE based on transmitting the set of downlink reference signal transmissions.

Some examples of the method, apparatuses, and non-transitory computer-readable medium described herein may further include operations, features, means, or instructions for transmitting, to the channel engineering device, an indication of the configuration of the set of configurations for the channel engineering device to use to deflect subsequent transmissions from the base station to the UE based on receiving the report from the UE. In some examples of the method, apparatuses, and non-transitory computer-readable medium described herein, receiving the report from the UE indicating the configuration for the channel engineering device to use to deflect subsequent transmissions from the base station to the UE may include operations, features, means, or instructions for receiving the report from the UE on a resource corresponding to the configuration for the channel engineering device to use to deflect subsequent transmissions from the base station to the UE.

Some examples of the method, apparatuses, and non-transitory computer-readable medium described herein may further include operations, features, means, or instructions for transmitting, to the UE, an indication of a set of resources each allocated for transmitting the report, where each resource may be allocated to indicate a different configuration of the set of configurations for the channel engineering device to use to deflect subsequent transmissions from the base station to the UE. In some examples of the method, apparatuses, and non-transitory computer-readable medium described herein, transmitting the set of downlink reference signal transmissions may include operations, features, means, or instructions for transmitting the set of downlink reference signal transmissions on a single beam for deflection by the channel engineering device to the UE in a beam sweep using the set of configurations.

In some examples of the method, apparatuses, and non-transitory computer-readable medium described herein, transmitting the set of downlink reference signal transmissions on the single beam may include operations, features, means, or instructions for transmitting the set of downlink reference signal transmissions in consecutive symbols. In some examples of the method, apparatuses, and non-transitory computer-readable medium described herein, the set of downlink reference signal transmissions includes a set of channel state information reference signal transmissions.

A method of wireless communication at a UE is described. The method may include receiving, from a channel engineering device, a set of downlink reference signal transmissions from a base station each deflected by the channel engineering device using a corresponding configuration of a set of configurations, performing measurements on each of the set of downlink reference signal transmissions deflected by the channel engineering device based on the receiving, and transmitting, to the channel engineering device, a report on the measurements performed on each of the set of downlink reference signal transmissions, where a resource on which the report is transmitted indicates a configuration of the set of configurations for the channel engineering device to use to deflect subsequent transmissions from the base station to the UE.

An apparatus for wireless communication at a UE is described. The apparatus may include a processor, memory coupled with the processor, and instructions stored in the memory. The instructions may be executable by the processor to cause the apparatus to receive, from a channel engineering device, a set of downlink reference signal transmissions from a base station each deflected by the channel engineering device using a corresponding configuration of a set of configurations, perform measurements on each of the set of downlink reference signal transmissions deflected by the channel engineering device based on the receiving, and transmit, to the channel engineering device, a report on the measurements performed on each of the set of downlink reference signal transmissions, where a resource on which the report is transmitted indicates a configuration of the set of configurations for the channel engineering device to use to deflect subsequent transmissions from the base station to the UE.

Another apparatus for wireless communication at a UE is described. The apparatus may include means for receiving, from a channel engineering device, a set of downlink reference signal transmissions from a base station each deflected by the channel engineering device using a corresponding configuration of a set of configurations, performing measurements on each of the set of downlink reference signal transmissions deflected by the channel engineering device based on the receiving, and transmitting, to the channel engineering device, a report on the measurements performed on each of the set of downlink reference signal transmissions, where a resource on which the report is transmitted indicates a configuration of the set of configurations for the channel engineering device to use to deflect subsequent transmissions from the base station to the UE.

A non-transitory computer-readable medium storing code for wireless communication at a UE is described. The code may include instructions executable by a processor to receive, from a channel engineering device, a set of downlink reference signal transmissions from a base station each deflected by the channel engineering device using a corresponding configuration of a set of configurations, perform measurements on each of the set of downlink reference signal transmissions deflected by the channel engineering device based on the receiving, and transmit, to the channel engineering device, a report on the measurements performed on each of the set of downlink reference signal transmissions, where a resource on which the report is transmitted indicates a configuration of the set of configurations for the channel engineering device to use to deflect subsequent transmissions from the base station to the UE.

Some examples of the method, apparatuses, and non-transitory computer-readable medium described herein may further include operations, features, means, or instructions for receiving, from the base station, an indication of a set of resources allocated for transmitting the report, where each resource may be allocated to indicate a different configuration of the set of configurations for the channel engineering device to use to deflect subsequent transmissions from the base station to the UE. In some examples of the method, apparatuses, and non-transitory computer-readable medium described herein, transmitting the report may include operations, features, means, or instructions for transmitting the report on a beam corresponding to the configuration for the channel engineering device to use to deflect subsequent transmissions to the UE.

In some examples of the method, apparatuses, and non-transitory computer-readable medium described herein, the measurements include reference signal received power measurements, reference signal received quality measurements, signal-to-interference-plus-noise ratio measurements, or a combination thereof. In some examples of the method, apparatuses, and non-transitory computer-readable medium described herein, the set of downlink reference signal transmissions includes a set of channel state information reference signal transmissions.

DETAILED DESCRIPTION

Figure 1:
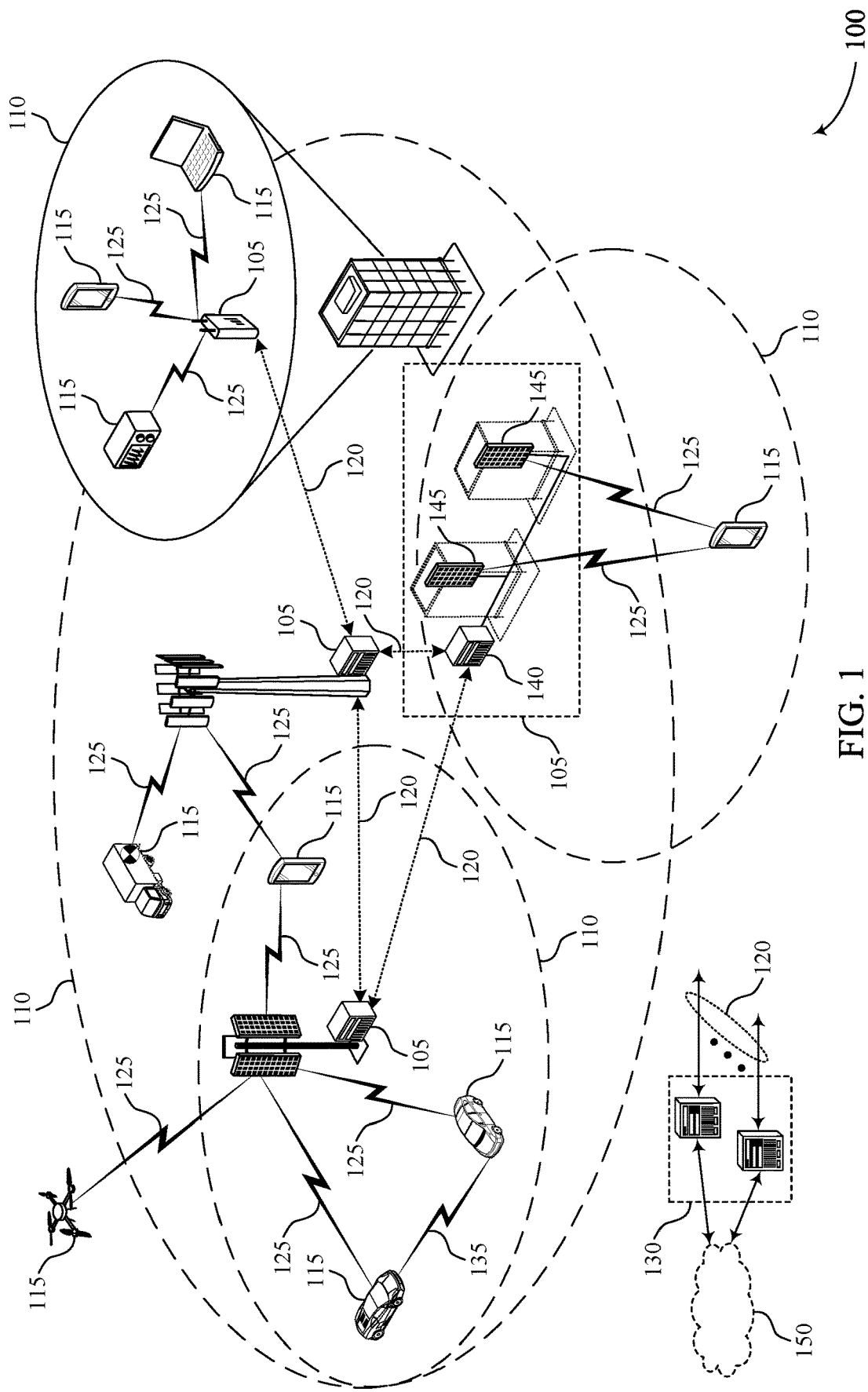
FIG. 1 illustrates an example of a wireless communications system that supports downlink beam management using a configurable deflector in accordance with aspects of the present disclosure.

Some wireless communications systems may support communications between a base station and a user equipment (UE) via a channel engineering device (CED). In particular, the base station may transmit downlink signals to the CED to be deflected to the UE. The CED may deflect the downlink signals to the UE such that the UE may reliably receive the downlink signals from the base station (e.g., even when there is an obstruction in the path between the base station and the UE). In such systems, it may be appropriate for the CED to identify a suitable configuration for deflecting downlink signals to the UE. However, some wireless communications systems may simply support techniques at a base station and a UE for identifying suitable configurations for communications directly between the base station and the UE.

In one aspect, a wireless communications system may support a downlink beam management procedure (e.g., P2 procedure) where a base station transmits multiple downlink reference signal transmissions on multiple transmit beams, and the UE indicates which of transmit beams the base station is to use for subsequent transmissions to the UE. In another aspect, the wireless communications system may support a downlink beam management (e.g., P3 procedure) where a base station transmits multiple downlink reference signal transmissions on a single transmit beam, and the UE may receive the downlink reference signal transmissions on different receive beams to identify which of the receive beams to use to receive subsequent downlink transmissions from the base station.

The above beam management procedures may allow a base station and a UE to identify suitable configurations for communicating directly with each other. However, these beam management procedures may not involve a CED. As a result, the CED may be unable to identify a suitable configuration for deflecting downlink transmissions from the base station to the UE. Further, if the CED uses a fixed configuration to deflect downlink transmissions to the UE, the likelihood that the UE is able to receive the deflected downlink transmissions may be low (e.g., if the location of the UE changes).

As described herein, a wireless communications system may support efficient techniques for allowing a CED to identify a suitable configuration for deflecting downlink transmissions from a base station to a UE. The base station may transmit control signaling to the CED indicating multiple configurations for deflecting downlink reference signals from the base station. Alternatively, the CED may identify the multiple configurations for deflecting downlink reference signals from the base station without control signaling from the base station (e.g., autonomously). The base station may then transmit the downlink reference signals to the CED, and the CED may deflect the downlink reference signals using the indicated configurations. The UE may receive the downlink reference signals from the base station via the CED, and the UE may perform measurements on the downlink reference signals. The UE may then report the measurements to the base station via the CED, and the base station may indicate a configuration for the CED to use to deflect subsequent transmissions from the base station to the UE based on the measurements.

Aspects of the disclosure introduced above are described below in the context of a wireless communications system. Examples of processes and signaling exchanges that support downlink beam management using a configurable deflector are then described. Aspects of the disclosure are further illustrated by and described with reference to apparatus diagrams, system diagrams, and flowcharts that relate to downlink beam management using a configurable deflector.

FIG. 1 illustrates an example of a wireless communications system 100 that supports downlink beam management using a configurable deflector in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications system 100 may support communications between a base station 105 and a UE 115 via a CED. In particular, the base station 105 may transmit downlink signals to the CED, and the CED may deflect the downlink signals to the UE 115. In some cases, a CED may be an example of a UE 115 in wireless communications system 100. In wireless communications system, the coverage of a base station 105 may be limited to line of sight (LOS) and specular deflections (e.g., reflections or refractions). Thus, adding specular deflectors (e.g., reflectors or refractors) may extend the coverage of base stations 105 to areas which may otherwise be uncovered. Both reflectors and refractors may also have a focusing energy or concentration effect to further enhance the link between a base station 105 and a UE 115. Metamaterials may be used to construct CEDs, and a base station 105 may configure the CEDs periodically to enhance coverage.

Figure 2:
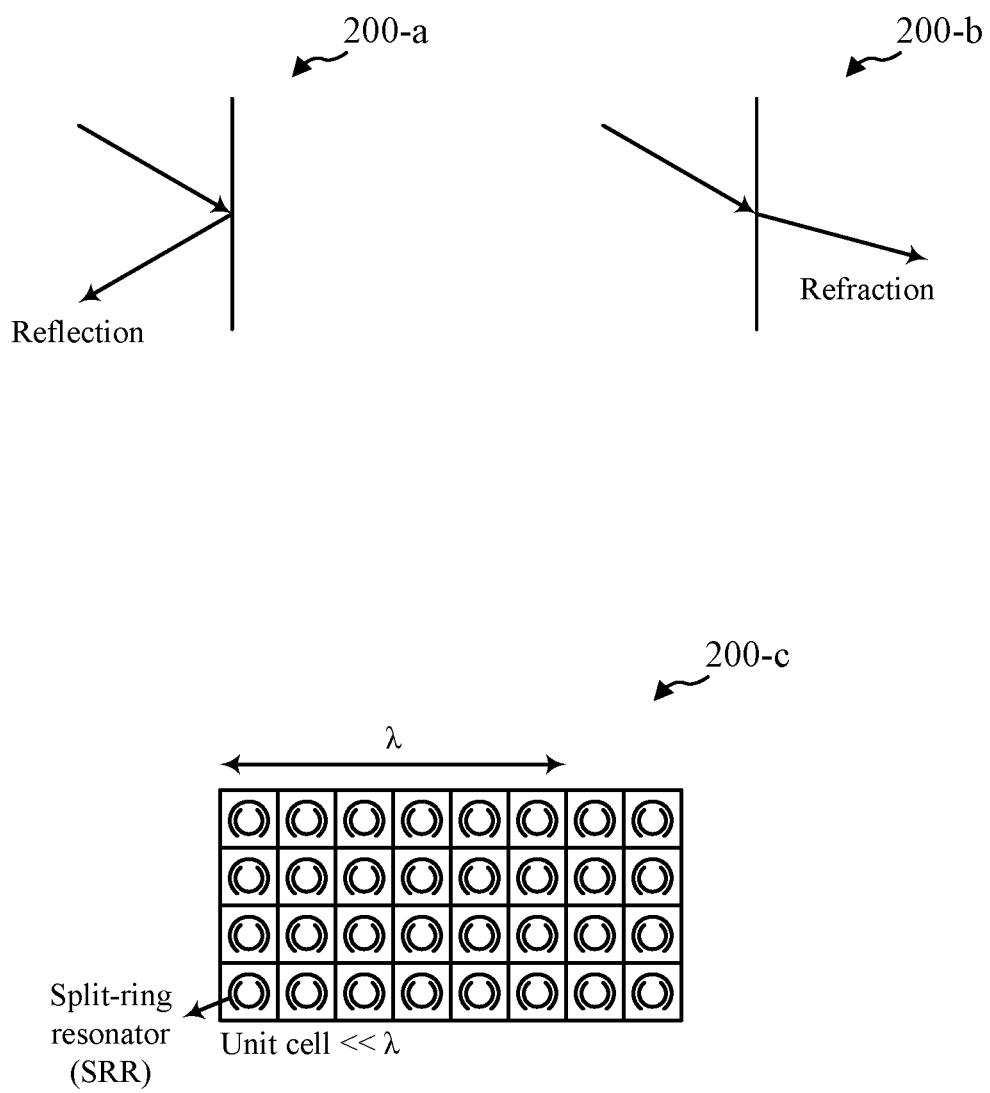
FIG. 2 illustrates examples of channel engineering devices (CEDs) in accordance with aspects of the present disclosure.

FIG. 2 illustrates examples of CEDs 200 in accordance with aspects of the present disclosure. In a first example 200-*a*, a base station 105 may transmit downlink signals to a CED, and the CED may reflect the downlink signals to a UE 115. In a second example 200-*b*, a base station 105 may transmit downlink signals to a CED, and the CED may refract the downlink signals to a UE 115. The third example 200-*c* shows one possible design of a CED. The CED may be made up of an electromagnetic metamaterial that affects waves that impinge on or interact with its structural features, which are smaller than the wavelength. To behave as a homogenous material accurately described by an effective refractive index, its features may be organized as unit cells that may each be much smaller than the wavelength ($\lambda$) of the downlink signals (or other signals intended to be reflected, refracted, or otherwise redirected by the CED). The CED may include an array of unit cells. In one example, each unit cell is a split-ring resonator (SRR). For example the SRR may be a pair of concentric metallic rings, formed on a dielectric substrate, with slits on opposite sides of the rings. However, any configuration of CED may be used consistent with the techniques described herein. Different use cases for the CED are illustrated in further detail in FIGS. 3-5.

Figure 3:
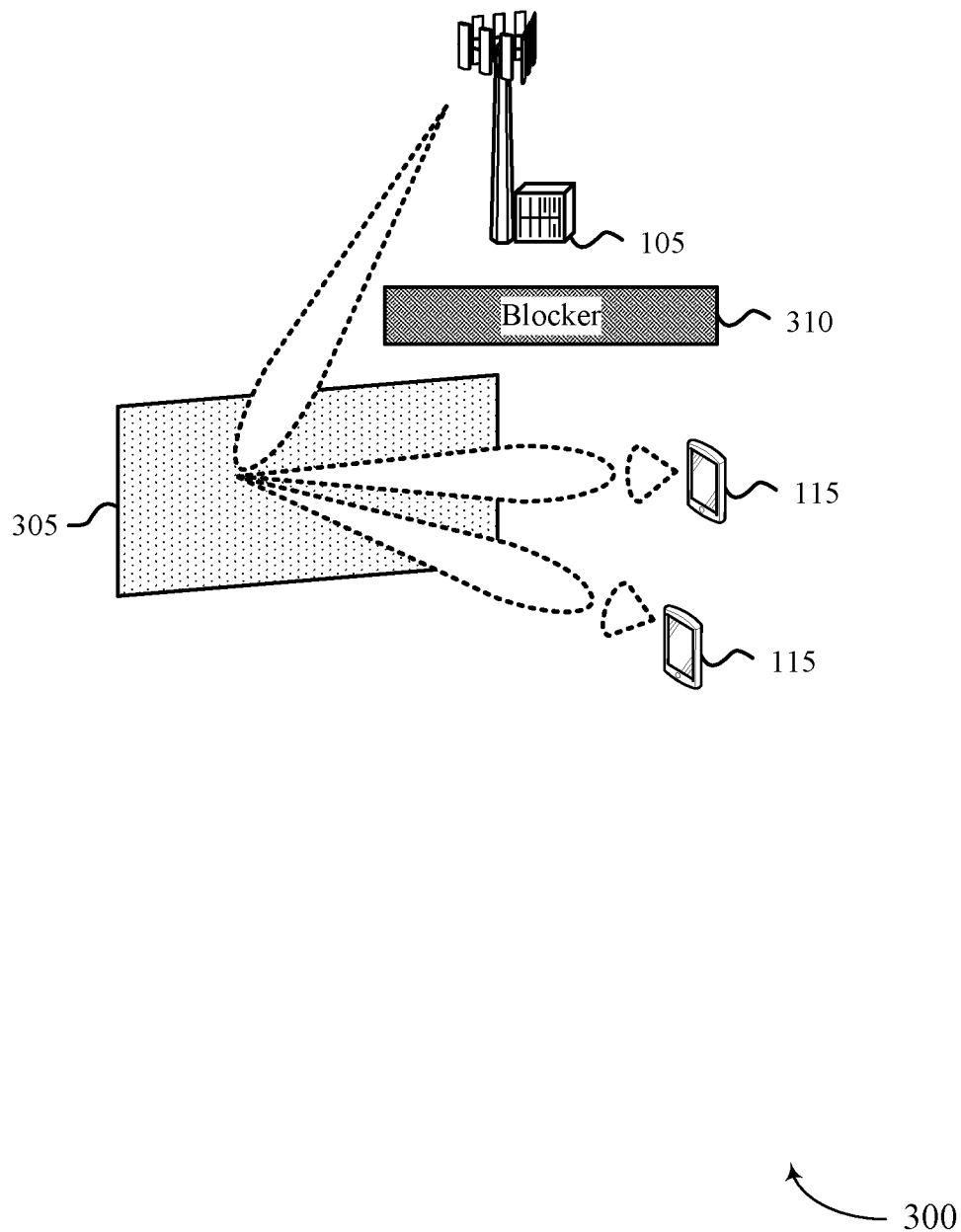
FIG. 3 illustrates an example of reflecting downlink transmissions from a base station to user equipment (UEs) in accordance with aspects of the present disclosure.

FIG. 3 illustrates an example of reflecting downlink transmissions 300 from a base station 105 to UEs 115 in accordance with aspects of the present disclosure. Because the direct path between the base station 105 and the UEs 115 may be obstructed by a blocker 310, the base station 105 may transmit the downlink transmissions to the CED 305, and the CED 305 may reflect the downlink transmissions to the UEs 115.

Figure 4:
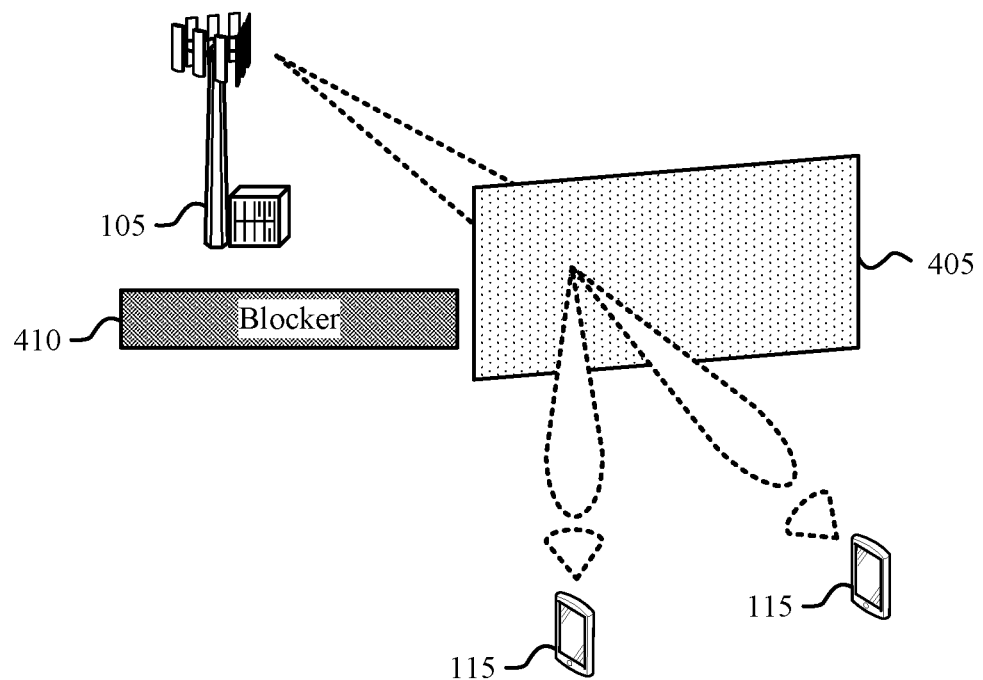
FIG. 4 illustrates an example of refracting downlink transmissions from a base station to UEs in accordance with aspects of the present disclosure.

FIG. 4 illustrates an example of refracting downlink transmissions 400 from a base station 105 to UEs 115 in accordance with aspects of the present disclosure. Because the direct path between the base station 105 and the UEs 115 may be obstructed by a blocker 410, the base station 105 may transmit the downlink transmissions to the CED 405, and the CED 405 may refract the downlink transmissions to the UE 115.

Figure 5:
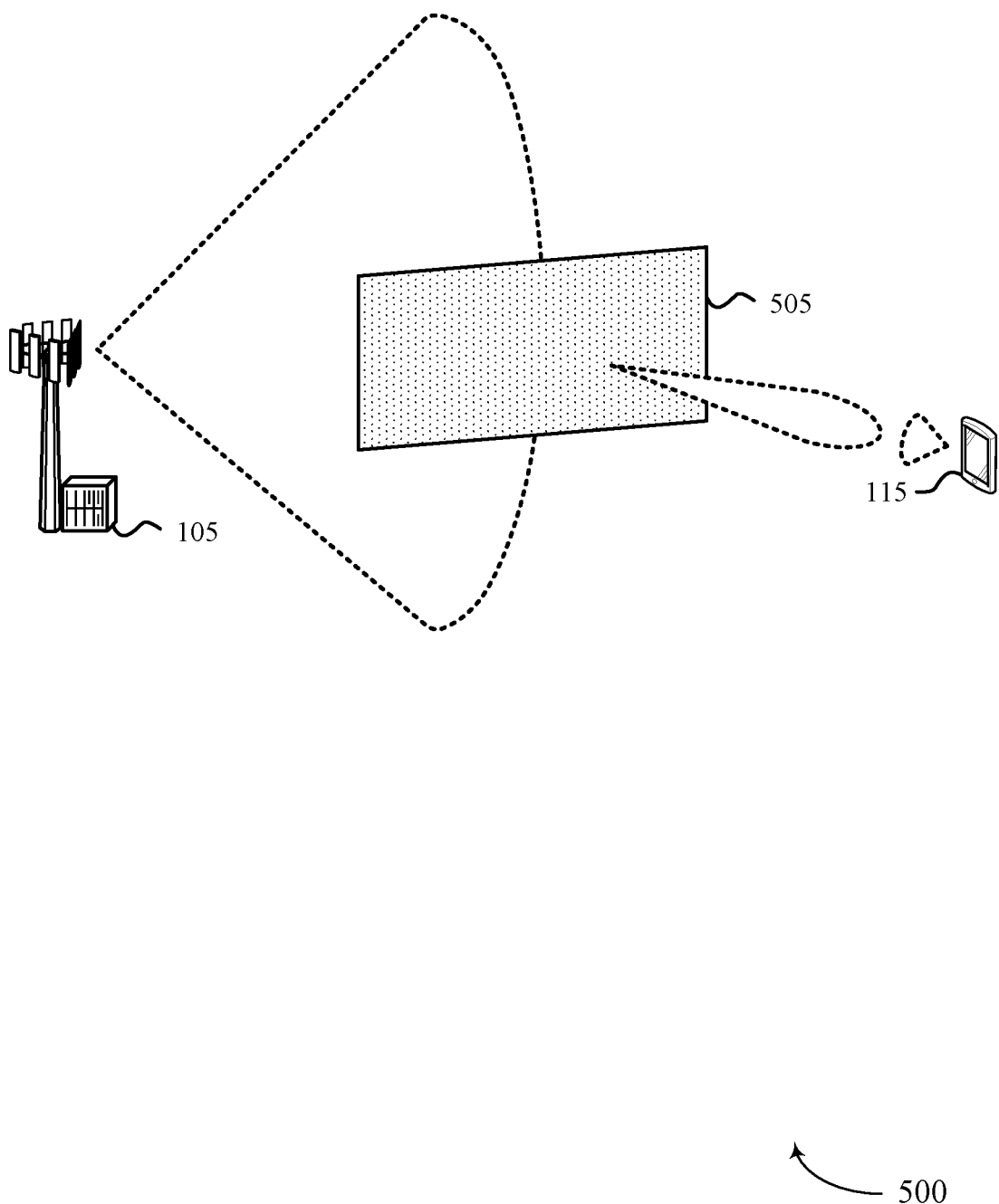
FIG. 5 illustrates an example of focusing downlink transmissions from a base station to a UE in accordance with aspects of the present disclosure.

FIG. 5 illustrates an example of focusing downlink transmissions 500 from a base station 105 to a UE 115 in accordance with aspects of the present disclosure. Because a beam used by the base station 105 for a downlink transmission may be wide, the CED 505 may receive the downlink transmission and deflect the downlink transmission to the UE 115 using a focused beam to improve the chances that the downlink transmission is received by the UE 115.

In the examples described above, a base station 105 may use a CED to deflect downlink transmissions to a UE 115 to improve the chances that the UE is able to receive the downlink transmissions. In each of the examples, it may be appropriate for the CED to identify a suitable configuration for deflecting downlink signals to the UE. However, some wireless communications systems may simply support techniques at a base station and a UE for identifying suitable configurations for communications directly between the base station and the UE.

In one aspect, a wireless communications system may support a first downlink beam management procedure (e.g., P2 procedure) to allow a base station 105 to identify a transmit beam for transmitting downlink transmissions to a UE 115. In this aspect, downlink reference signals (e.g., channel state information reference signals (CSI-RSs)) for beam management may be used to scan over base station transmit beams, and the UE 115 may measure these downlink reference signals and report the received beam quality for one or more of the transmit beams. Specifically, the base station 105 may transmit multiple downlink reference signal transmissions on multiple transmit beams, and the UE 115 may receive the downlink reference signal transmissions and perform measurements on the downlink reference signal transmissions. The UE 115 may then transmit a report including the measurements performed on one or more of the downlink reference signal transmissions, or the UE 115 may transmit a report indicating a transmit beam at the base station 105 associated with the best measurements (e.g., highest reference signal received power (RSRP), reference signal received quality (RSRQ), or signal-to-interference-plus-noise ratio (SINR)). Accordingly, the base station 105 may receive the report from the UE 115 and identify a transmit beam to use for subsequent downlink transmissions to the UE 115.

In another aspect, the wireless communications system may support a second downlink beam management (e.g., P3 procedure) to allow a UE 115 to identify a receive beam for receiving downlink transmissions from a base station 105. In this aspect, downlink reference signals (e.g., CSI-RSs) for beam management may be transmitted on a downlink transmit beam with repetition (e.g., over orthogonal frequency division multiplexing (OFDM) symbols), and the UE 115 may measure these downlink reference signals to refine its receive beams. Specifically, the base station 105 may transmit multiple downlink reference signal transmissions on a same transmit beam, and the UE 115 may receive the downlink reference signal transmissions on different receive beams and perform measurements on the downlink reference signal transmissions. The UE 115 may then identify a receive beam associated with the best measurements (e.g., highest RSRP, RSRQ, or SINR) to use to receive subsequent downlink transmissions from the base station 105.

The above beam management procedures may allow a base station 105 and a UE 115 to identify suitable configurations for communicating directly with each other. However, these beam management procedures may not involve a CED. As a result, the CED may be unable to identify a suitable configuration for deflecting downlink transmissions from the base station 105 to the UE 115. Further, if the CED uses a fixed configuration to deflect downlink transmissions to the UE 115, the likelihood that the UE 115 is able to receive the deflected downlink transmissions may be low (e.g., if the location of the UE 115 changes). Wireless communications system 100 may support efficient techniques for allowing a CED to identify a suitable configuration for deflecting downlink transmissions from a base station 105 to a UE 115. Specifically, wireless communications system 100 may introduce a beam management procedure for tracking base station transmit beams or different configurations at a CED when using a CED.

Figure 6:
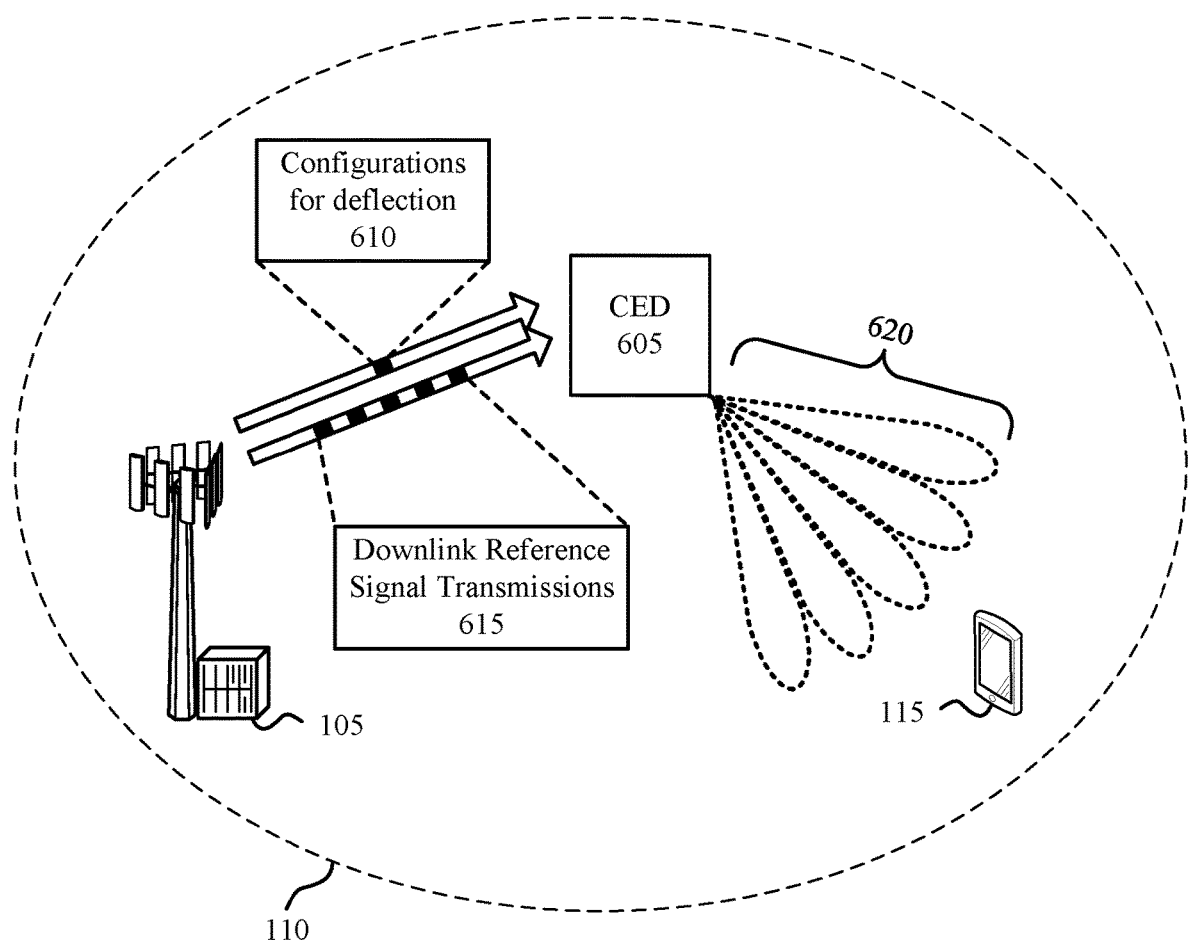
FIG. 6 illustrates an example of a wireless communications system that supports downlink beam management using a configurable deflector in accordance with aspects of the present disclosure.

FIG. 6 illustrates an example of a wireless communications system 600 that supports downlink beam management using a configurable deflector in accordance with aspects of the present disclosure. The wireless communications system 600 includes a UE 115, which may be an example of a UE 115 described with reference to FIGS. 1-5. The wireless communications system 600 also includes a CED 605, which may be an example of a CED described with reference to FIGS. 1-5. The wireless communications system 600 also includes a base station 105, which may be an example of a base station 105 described with reference to FIGS. 1-5. The base station 105 may provide communication coverage to one or more UEs 115 in a coverage area 110. The wireless communications system 600 may implement aspects of wireless communications system 100. For example, the wireless communications system 600 may support efficient techniques for allowing the CED 605 to identify a suitable configuration for deflecting downlink transmissions from the base station 105 to the UE 115.

In the example of FIG. 6, the base station 105 may transmit an indication 610 of multiple configurations 620 for the CED 605 to use to deflect downlink reference signal transmissions 615. Each configuration may correspond to an angle, power, etc. for the CED 605 to use to deflect a downlink reference signal transmission. Thus, the base station 105 may configure the CED 605 to have different deflection (e.g., reflection or refraction) angles for each downlink reference signal transmission (e.g., CSI-RS repetition symbol).

The base station 105 may then transmit multiple downlink reference signal transmissions to the CED 605, and the CED 605 may deflect the downlink reference signal transmissions using the configurations 620. The procedure at the base station 105 may resemble a P3 procedure since the base station 105 may transmit the downlink reference signal transmissions using a same transmit beam. That is, the base station 105 may be configured to transmit downlink reference signal transmissions (e.g., CSI-RS transmissions) with repetition (e.g., P3 CSI-RS). The base station 105 may select the transmit beam to use to transmit the downlink reference signal transmissions to the CED 605 when the CED first connects to the base station 105.

The UE 115 may receive the downlink reference signal transmissions deflected using the configurations 620. Because the CED 605 may deflect the downlink reference signal transmissions using the different configurations 620, the UE 115 may see different beam angles for each downlink reference signal transmission (e.g., on each CSI-RS resource), even though the base station 105 may transmit the downlink reference signal transmissions to the CED 605 on the same transmit beam (e.g., even though the base station 105 used repetition to transmit the downlink reference signal transmissions). Thus, the procedure at the UE 115 may resemble a P2 procedure since the UE 115 may receive the downlink reference signal transmissions at different angles.

The UE 115 may then perform measurements on each of the downlink reference signal transmissions (e.g., measure the received beam quality of each CSI-RS resource), and the UE 115 may identify a downlink reference signal transmission with the best measurements (e.g., highest RSRP, RSRQ, or SINR). The UE 115 may then transmit a report to the CED 605 indicating the downlink reference signal transmission with the best measurements, and the CED 605 may deflect the report to the base station 105. In one example, the report may include measurements on each of the downlink reference signal transmissions (e.g., order from the downlink reference signal transmission with the best measurements to the downlink reference signal transmission with the worst measurements). In another example, the report may include measurements for the downlink reference signal transmission with the best measurements.

Further, in some aspects, the UE 115 may transmit the report to the base station 105 on a resource corresponding to the downlink reference signal transmission with the best measurements. For instance, each downlink reference signal resource (e.g., CSI-RS resource) may be associated with a different time or frequency resource on which the report may be sent. In such aspects, the base station 105 may transmit an indication of multiple resources or resource sets each allocated for transmitting the report, and each resource or resource set may correspond to a different downlink reference signal transmission. The UE 115 may then identify the downlink reference signal transmission with the best measurements, and the UE 115 may transmit the report on a resource or resource set corresponding to the downlink reference signal transmission with the best measurements. For instance, the UE 115 may report back to the CED using a time or frequency resource associated with the best CSI-RS (e.g., the CSI-RS with the highest RSRP, layer 1 SINR, spectral efficiency, etc.)

The CED 605 may deflect the report to the base station 105, and the base station 105 may determine that the CED 605 is to use the configuration associated with the downlink reference signal transmission with the best measurements to deflect subsequent transmissions to the UE 115. Accordingly, the base station 105 may transmit an indication to the CED 605 of the configuration that the CED 605 is to use to deflect subsequent transmissions to the UE 115. Because the CED 605 may use a configuration associated with the best measurements to transmit subsequent transmissions to the UE 115, the throughput in wireless communications system 600 may be improved, and the coverage of the base station 105 may be enhanced.

Figure 7:
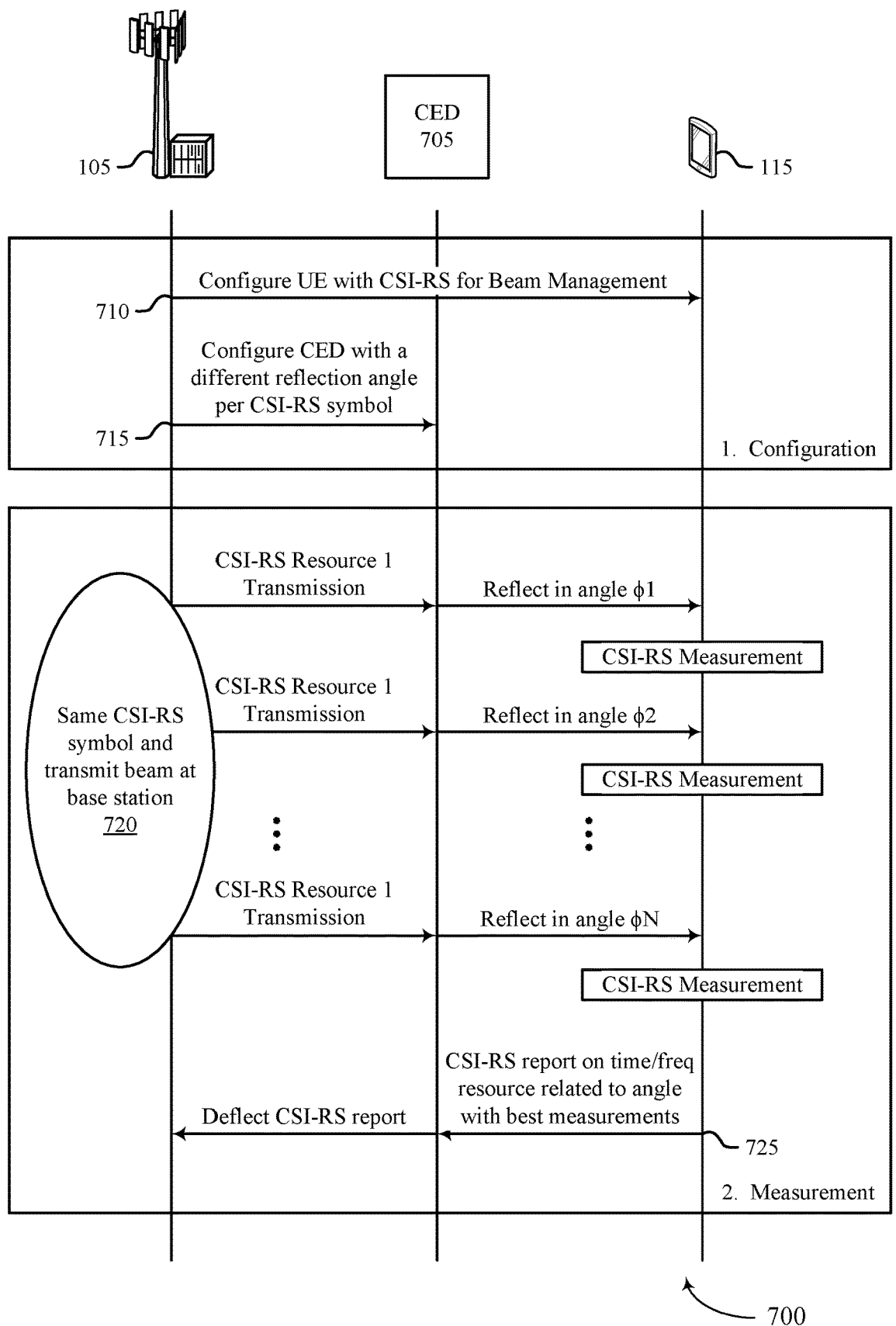
FIG. 7 illustrates an example of a process flow that supports downlink beam management using a configurable deflector in accordance with aspects of the present disclosure.

FIG. 7 illustrates an example of a process flow 700 that supports downlink beam management using a configurable deflector in accordance with aspects of the present disclosure. Process flow 700 illustrates aspects of techniques performed by a UE 115, which may be an example of a UE 115 described with reference to FIGS. 1-6. Process flow 700 also illustrates aspects of techniques performed by a CED 705, which may be an example of a CED described with reference to FIGS. 1-6. Process flow 700 also illustrates aspects of techniques performed by a base station 105, which may be an example of a base station 105 described with reference to FIGS. 1-6. Process flow 700 may implement aspects of wireless communications system 600. For example, the process flow 700 may support efficient techniques for allowing the CED 705 to identify a suitable configuration for deflecting downlink transmissions from the base station 105 to the UE 115.

In the following description of the process flow 700, the operations between the base station 105, the CED 705, and the UE 115 may be transmitted in a different order than the example order shown, or the operations performed by the base station 105, the CED 705, and the UE 115 may be performed in different orders or at different times. Some operations may also be omitted from the process flow 700, and other operations may be added to the process flow 700. Further, although operations in the process flow 700 may be divided into a configuration group and a measurement group, it is to be understood that these groups are illustrated for explanation purposes, and the process flow may not be restricted to any number of operations in any number of groups.

At 710, the base station 105 may configure the UE 115 with CSI-RSs for beam management. Specifically, the base station 105 may configure the UE 115 to perform P2 or P3 procedure to identify suitable beams for communicating with the base station 105. At 710, the base station 105 may configure the CED 705 with a different reflection angle per CSI-RS symbol (e.g., configure the CED 705 to use different configurations to deflect CSI-RSs from the base station 105 to the UE 115). In particular, the base station 105 may transmit, and the CED 705 may receive, control signaling indicating a set of configurations for deflecting a set of CSI-RS transmissions received from the base station 105. In some cases, each configuration in the set of configurations may correspond to a different angle at which the CED 705 is to deflect a CSI-RS transmission.

At 720, the base station 105 may transmit a set of CSI-RS transmissions (e.g., each on a different CSI-RS resource) to the CED 705, and the CED 705 may receive the set of downlink reference signal transmissions. The base station 105 may transmit, and the CED 705 may receive, the set of CSI-RS transmission to the CED 705 on a single beam. Further, the base station 105 may transmit, and the CED 705 may receive, the set of CSI-RS transmissions in consecutive symbols or non-consecutive symbols. The CED 705 may then deflect each CSI-RS transmission of the set of CSI-RS transmissions according to a corresponding configuration of the set of configurations. Because each configuration may be associated with a CSI-RS resource (e.g., symbol), the CED 705 may be able to identify the configuration to use to deflect a CSI-RS transmission received in each CSI-RS resource (e.g., symbol).

The UE 115 may receive the set of CSI-RS transmissions from the base station 105 each deflected by the CED 705 using a corresponding configuration of the set of configurations. The UE 115 may then perform measurements on each of the set of CSI-RS transmissions (e.g., RSRP, RSRQ, or SINR measurements). At 725, the UE 115 may transmit, to the CED 705, a CSI-RS report on the measurements performed on each of the set of CSI-RS transmission. The CSI-RS report may indicate a best configuration for the CED 705 to use to deflect subsequent downlink transmissions from the base station 105 to the UE 115. Further, the UE 115 may transmit the CSI-RS report on a beam corresponding to the configuration for the CED to use to deflect subsequent transmissions from the base station 105 to the UE 115 (e.g., a reciprocal beam to the beam to be used by the CED 705 to deflect subsequent transmissions from the base station 105 to the UE 115).

In some aspects, the UE 115 may transmit the CSI-RS report on a resource corresponding to a configuration for the CED 705 to use to deflect subsequent transmissions from the base station 105 to the UE 115. For instance, the UE 115 may transmit the CSI-RS report on a time or frequency resource related to an angle with the best measurements at the UE 115. In such aspects, the base station 105 may transmit, and the UE may receive, an indication of a set of resources allocated for transmitting the report, where each resource is allocated to indicate that a different configuration is best (e.g., indicate a different configuration for the CED 705 to use to deflect subsequent transmissions from the base station 105 to the UE 115). The CED 705 may then deflect the CSI-RS report to the base station 105. The base station 105 may identify the configuration (e.g., best configuration) for the CED 705 to use to deflect subsequent downlink transmissions from the base station 105 to the UE 115, and the base station 105 may transmit an indication to the CED 705 of the configuration for the CED 705 to use to deflect subsequent downlink transmissions from the base station 105 to the UE 115.

Figure 8:
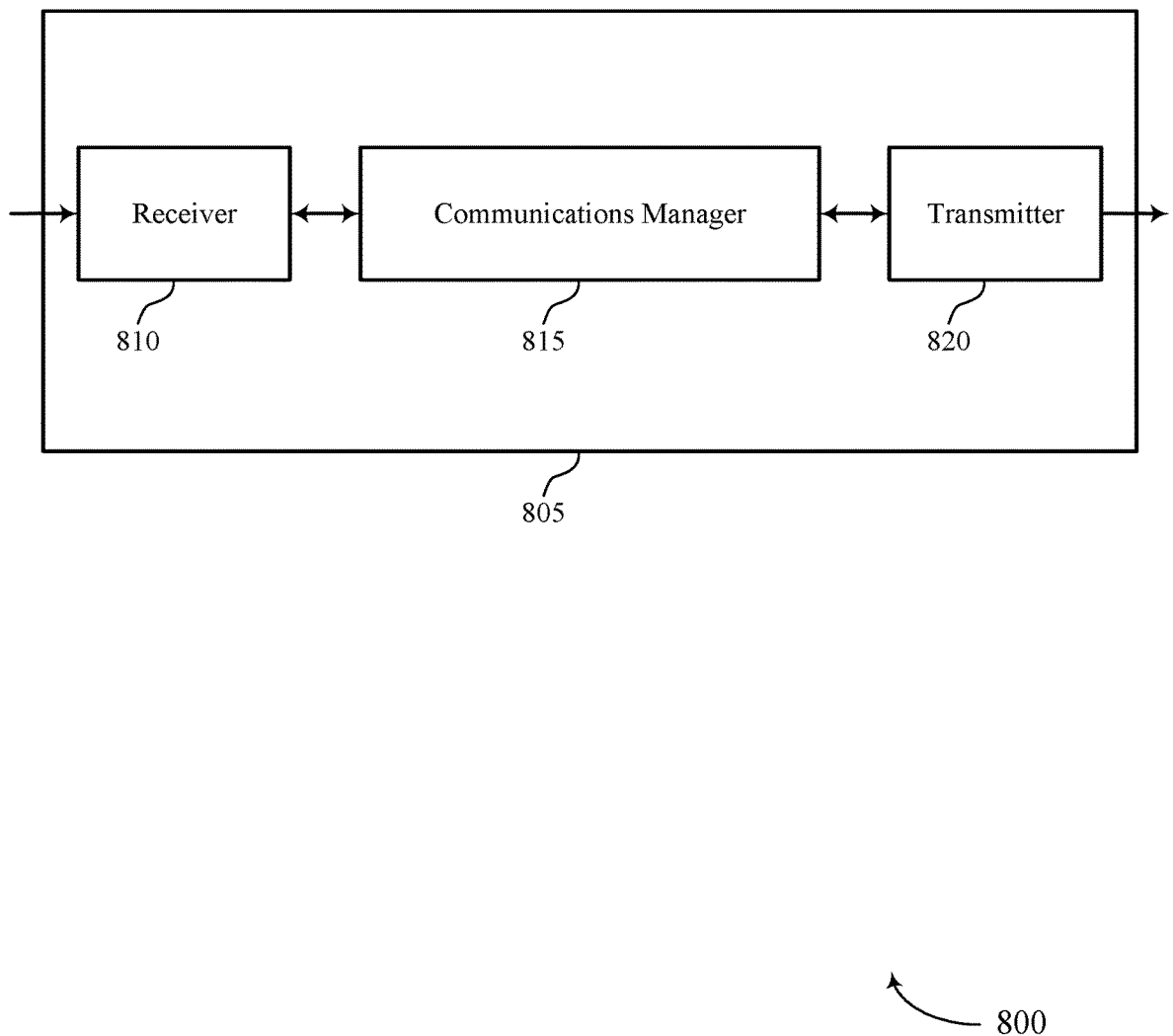
FIGS. 8 and 9 show block diagrams of devices that support downlink beam management using a configurable deflector in accordance with aspects of the present disclosure.

FIG. 8 shows a block diagram 800 of a device 805 that supports downlink beam management using a configurable deflector in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to downlink beam management using a configurable deflector, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a channel engineering device, a set of downlink reference signal transmissions from a base station each deflected by the channel engineering device using a corresponding configuration of a set of configurations, perform measurements on each of the set of downlink reference signal transmissions deflected by the channel engineering device based on the receiving, and transmit, to the channel engineering device, a report on the measurements performed on each of the set of downlink reference signal transmissions, where a resource on which the report is transmitted indicates a configuration of the set of configurations for the channel engineering device to use to deflect subsequent transmissions from the base station to the UE. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
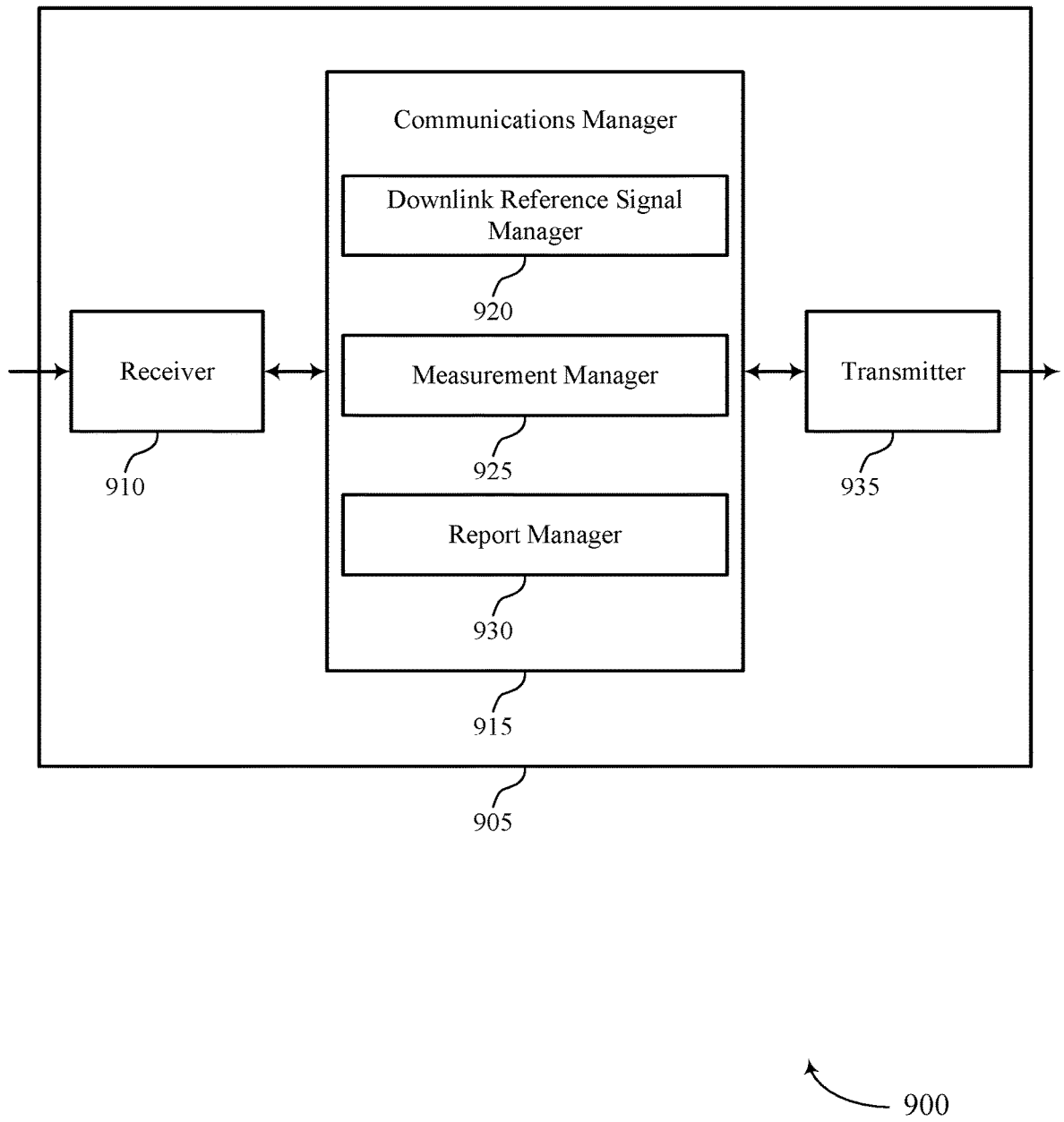

FIG. 9 shows a block diagram 900 of a device 905 that supports downlink beam management using a configurable deflector in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to downlink beam management using a configurable deflector, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a downlink reference signal manager 920, a measurement manager 925, and a report manager 930. The communications manager 915 may be an example of aspects of the communications manager 1110 described herein.

The downlink reference signal manager 920 may receive, from a channel engineering device, a set of downlink reference signal transmissions from a base station each deflected by the channel engineering device using a corresponding configuration of a set of configurations. The measurement manager 925 may perform measurements on each of the set of downlink reference signal transmissions deflected by the channel engineering device based on the receiving. The report manager 930 may transmit, to the channel engineering device, a report on the measurements performed on each of the set of downlink reference signal transmissions, where a resource on which the report is transmitted indicates a configuration of the set of configurations for the channel engineering device to use to deflect subsequent transmissions from the base station to the UE.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
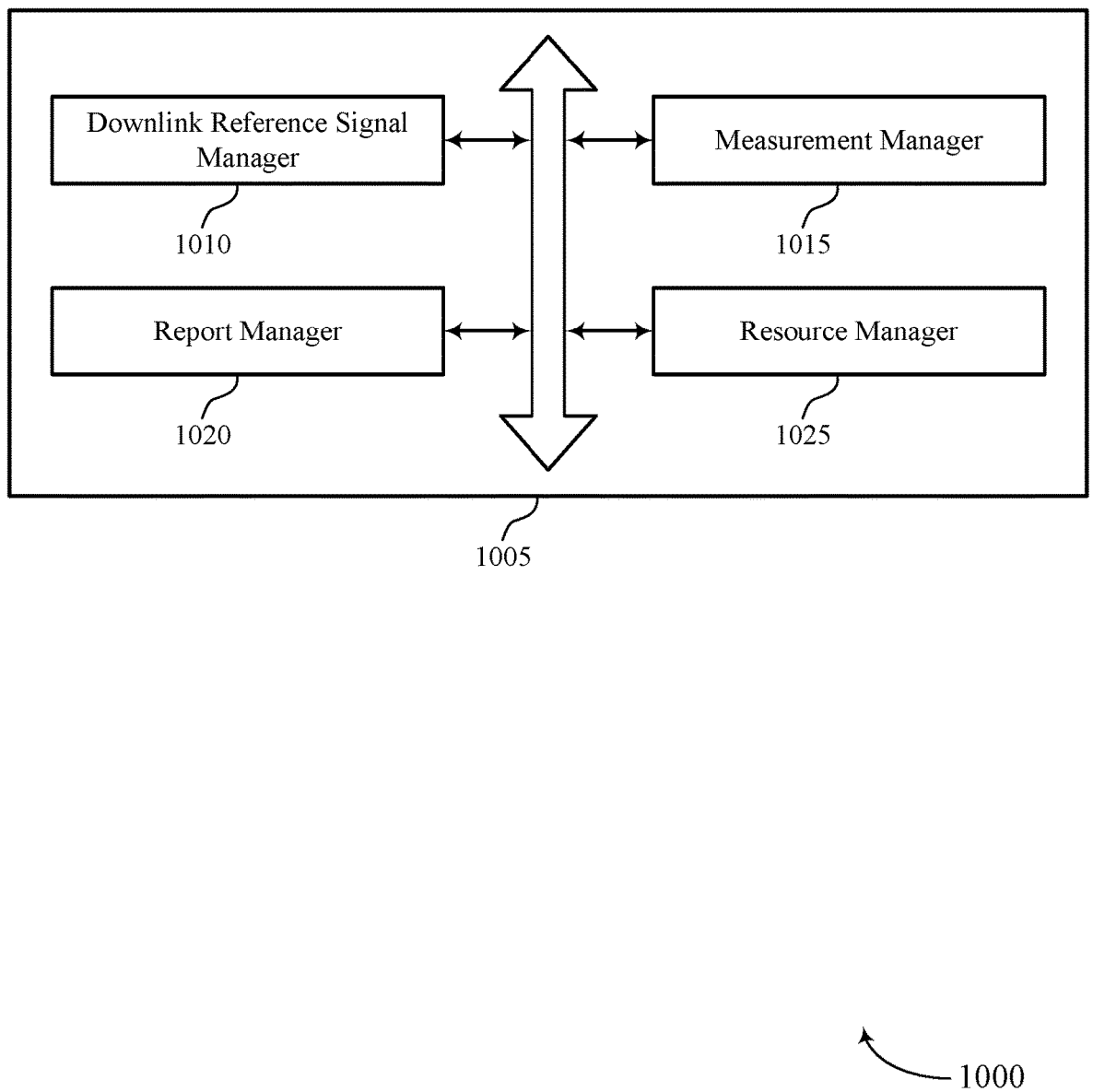
FIG. 10 shows a block diagram of a communications manager that supports downlink beam management using a configurable deflector in accordance with aspects of the present disclosure.

FIG. 10 shows a block diagram 1000 of a communications manager 1005 that supports downlink beam management using a configurable deflector in accordance with aspects of the present disclosure. The communications manager 1005 may be an example of aspects of a communications manager 815, a communications manager 915, or a communications manager 1110 described herein. The communications manager 1005 may include a downlink reference signal manager 1010, a measurement manager 1015, a report manager 1020, and a resource manager 1025. Each of these modules may communicate, directly or indirectly, with one another (e.g., via one or more buses).

The downlink reference signal manager 1010 may receive, from a channel engineering device, a set of downlink reference signal transmissions from a base station each deflected by the channel engineering device using a corresponding configuration of a set of configurations. The measurement manager 1015 may perform measurements on each of the set of downlink reference signal transmissions deflected by the channel engineering device based on the receiving. The report manager 1020 may transmit, to the channel engineering device, a report on the measurements performed on each of the set of downlink reference signal transmissions, where a resource on which the report is transmitted indicates a configuration of the set of configurations for the channel engineering device to use to deflect subsequent transmissions from the base station to the UE.

The resource manager 1025 may receive, from the base station, an indication of a set of resources allocated for transmitting the report, where each resource is allocated to indicate a different configuration of the set of configurations for the channel engineering device to use to deflect subsequent transmissions from the base station to the UE. In some examples, the report manager 1020 may transmit the report on a beam corresponding to the configuration for the channel engineering device to use to deflect subsequent transmissions to the UE. In some cases, the measurements include reference signal received power measurements, reference signal received quality measurements, signal-to-interference-plus-noise ratio measurements, or a combination thereof. In some cases, the set of downlink reference signal transmissions includes a set of channel state information reference signal transmissions.

Figure 11:
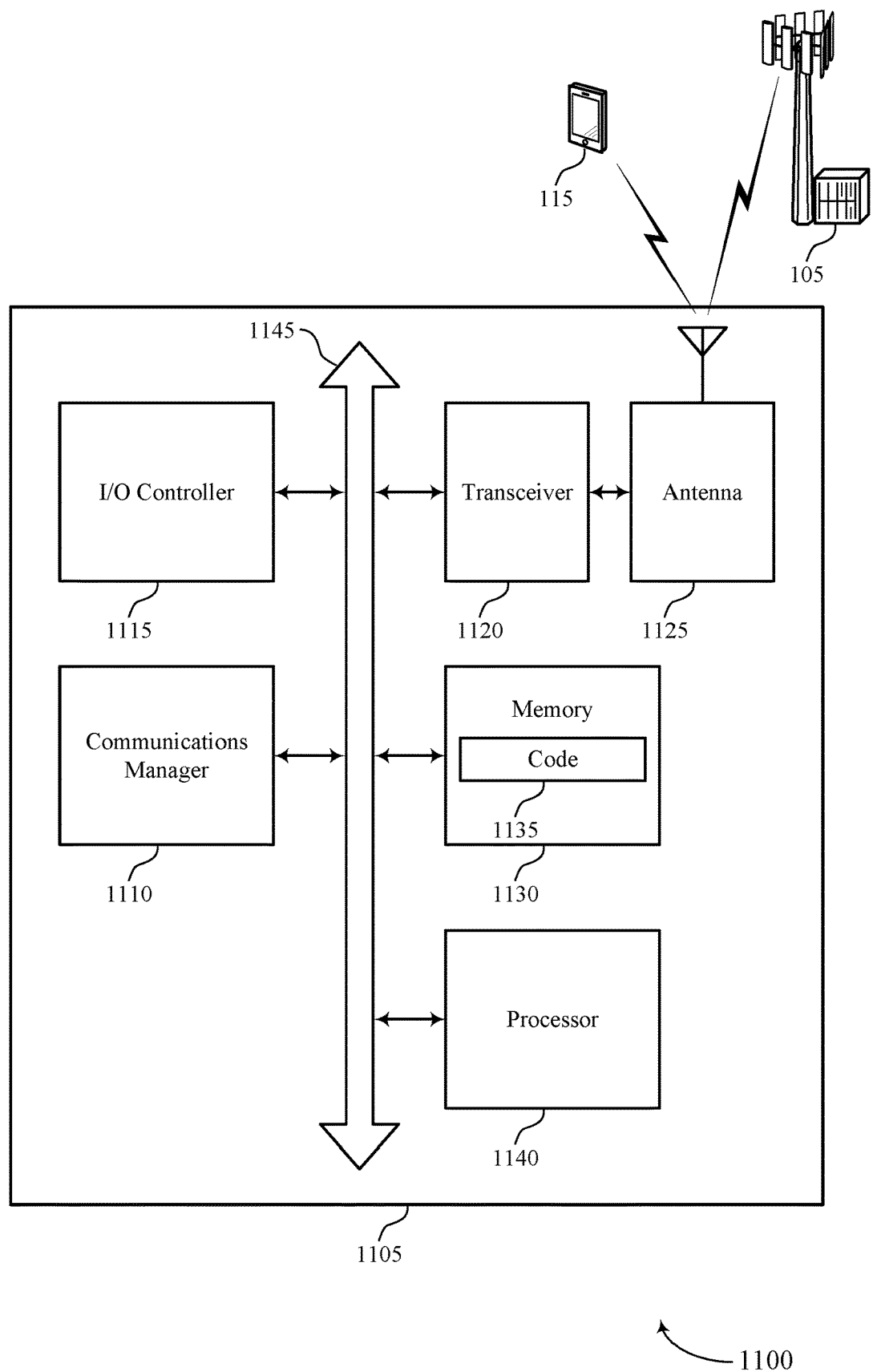
FIG. 11 shows a diagram of a system including a device that supports downlink beam management using a configurable deflector in accordance with aspects of the present disclosure.

FIG. 11 shows a diagram of a system 1100 including a device 1105 that supports downlink beam management using a configurable deflector in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a channel engineering device, a set of downlink reference signal transmissions from a base station each deflected by the channel engineering device using a corresponding configuration of a set of configurations, perform measurements on each of the set of downlink reference signal transmissions deflected by the channel engineering device based on the receiving, and transmit, to the channel engineering device, a report on the measurements performed on each of the set of downlink reference signal transmissions, where a resource on which the report is transmitted indicates a configuration of the set of configurations for the channel engineering device to use to deflect subsequent transmissions from the base station to the UE.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting downlink beam management using a configurable deflector).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
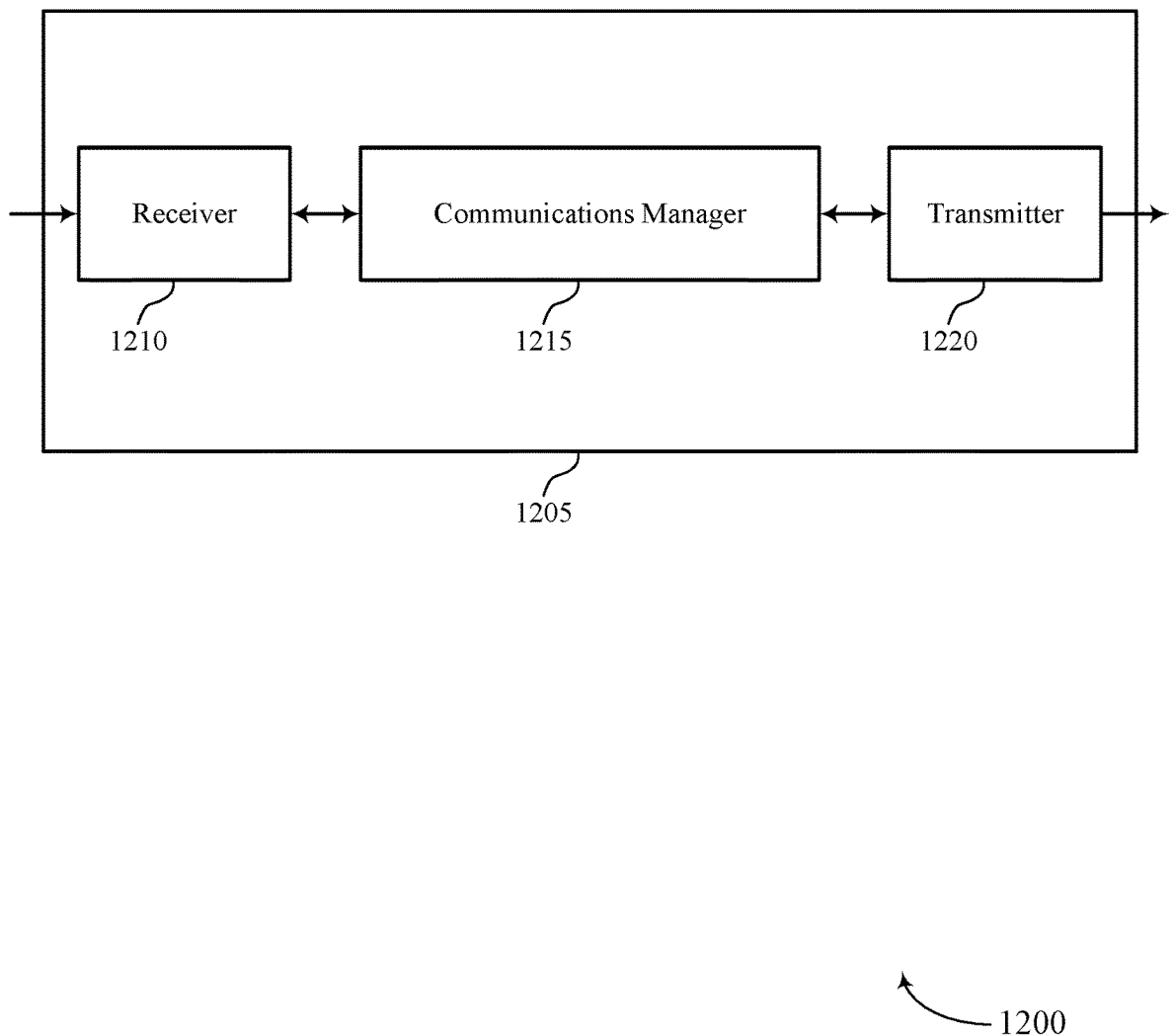
FIGS. 12 and 13 show block diagrams of devices that support downlink beam management using a configurable deflector in accordance with aspects of the present disclosure.

FIG. 12 shows a block diagram 1200 of a device 1205 that supports downlink beam management using a configurable deflector in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to downlink beam management using a configurable deflector, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a channel engineering device, control signaling indicating a set of configurations for deflecting a set of downlink reference signal transmissions received from the base station, transmit, to the channel engineering device, a set of downlink reference signal transmissions based on transmitting the control signaling indicating the set of configurations, and receive, from the UE, a report indicating a configuration of the set of configurations for the channel engineering device to use to deflect subsequent transmissions from the base station to the UE based on transmitting the set of downlink reference signal transmissions. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
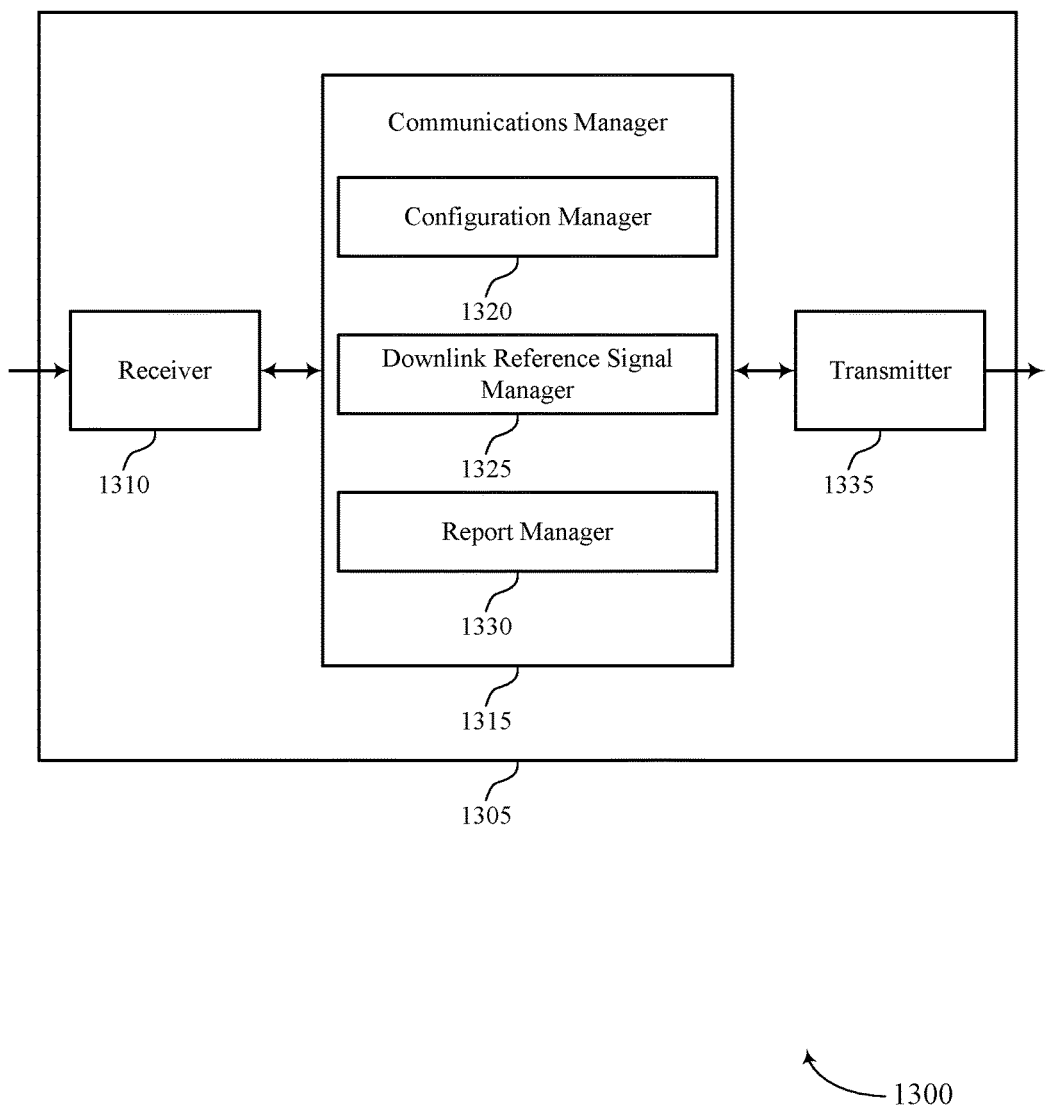

FIG. 13 shows a block diagram 1300 of a device 1305 that supports downlink beam management using a configurable deflector in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to downlink beam management using a configurable deflector, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a configuration manager 1320, a downlink reference signal manager 1325, and a report manager 1330. The communications manager 1315 may be an example of aspects of the communications manager 1510 described herein.

The configuration manager 1320 may transmit, to a channel engineering device, control signaling indicating a set of configurations for deflecting a set of downlink reference signal transmissions received from the base station. The downlink reference signal manager 1325 may transmit, to the channel engineering device, a set of downlink reference signal transmissions based on transmitting the control signaling indicating the set of configurations. The report manager 1330 may receive, from the UE, a report indicating a configuration of the set of configurations for the channel engineering device to use to deflect subsequent transmissions from the base station to the UE based on transmitting the set of downlink reference signal transmissions.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
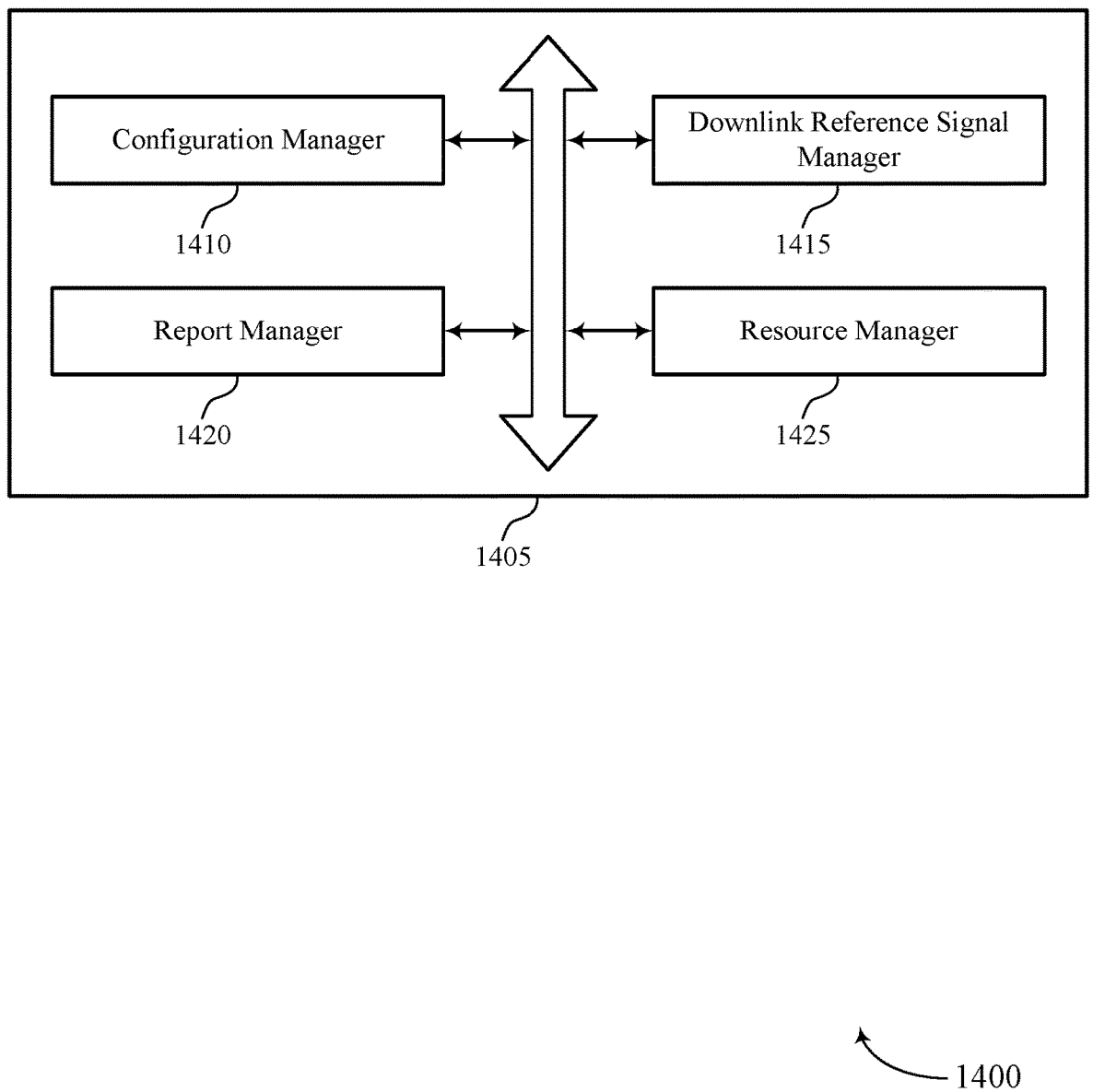
FIG. 14 shows a block diagram of a communications manager that supports downlink beam management using a configurable deflector in accordance with aspects of the present disclosure.

FIG. 14 shows a block diagram 1400 of a communications manager 1405 that supports downlink beam management using a configurable deflector in accordance with aspects of the present disclosure. The communications manager 1405 may be an example of aspects of a communications manager 1215, a communications manager 1315, or a communications manager 1510 described herein. The communications manager 1405 may include a configuration manager 1410, a downlink reference signal manager 1415, a report manager 1420, and a resource manager 1425. Each of these modules may communicate, directly or indirectly, with one another (e.g., via one or more buses).

The configuration manager 1410 may transmit, to a channel engineering device, control signaling indicating a set of configurations for deflecting a set of downlink reference signal transmissions received from the base station. The downlink reference signal manager 1415 may transmit, to the channel engineering device, a set of downlink reference signal transmissions based on transmitting the control signaling indicating the set of configurations. The report manager 1420 may receive, from the UE, a report indicating a configuration of the set of configurations for the channel engineering device to use to deflect subsequent transmissions from the base station to the UE based on transmitting the set of downlink reference signal transmissions.

In some examples, the configuration manager 1410 may transmit, to the channel engineering device, an indication of the configuration of the set of configurations for the channel engineering device to use to deflect subsequent transmissions from the base station to the UE based on receiving the report from the UE. In some examples, the report manager 1420 may receive the report from the UE on a resource corresponding to the configuration for the channel engineering device to use to deflect subsequent transmissions from the base station to the UE. The resource manager 1425 may transmit, to the UE, an indication of a set of resources each allocated for transmitting the report, where each resource is allocated to indicate a different configuration of the set of configurations for the channel engineering device to use to deflect subsequent transmissions from the base station to the UE.

In some examples, the downlink reference signal manager 1415 may transmit the set of downlink reference signal transmissions on a single beam for deflection by the channel engineering device to the UE in a beam sweep using the set of configurations. In some examples, the downlink reference signal manager 1415 may transmit the set of downlink reference signal transmissions in consecutive symbols. In some cases, the set of downlink reference signal transmissions includes a set of channel state information reference signal transmissions.

Figure 15:
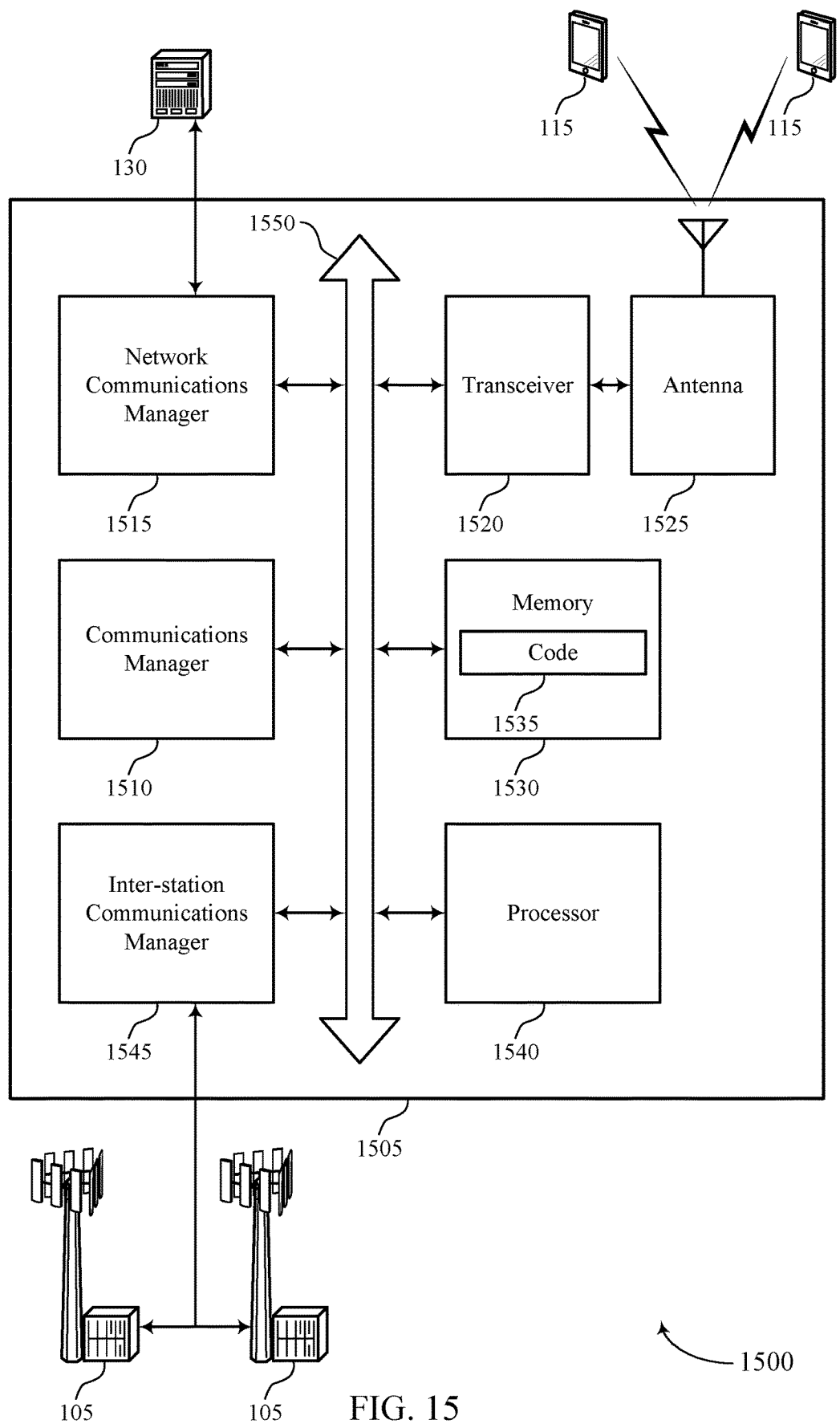
FIG. 15 shows a diagram of a system including a device that supports downlink beam management using a configurable deflector in accordance with aspects of the present disclosure.

FIG. 15 shows a diagram of a system 1500 including a device 1505 that supports downlink beam management using a configurable deflector in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a channel engineering device, control signaling indicating a set of configurations for deflecting a set of downlink reference signal transmissions received from the base station, transmit, to the channel engineering device, a set of downlink reference signal transmissions based on transmitting the control signaling indicating the set of configurations, and receive, from the UE, a report indicating a configuration of the set of configurations for the channel engineering device to use to deflect subsequent transmissions from the base station to the UE based on transmitting the set of downlink reference signal transmissions.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting downlink beam management using a configurable deflector).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
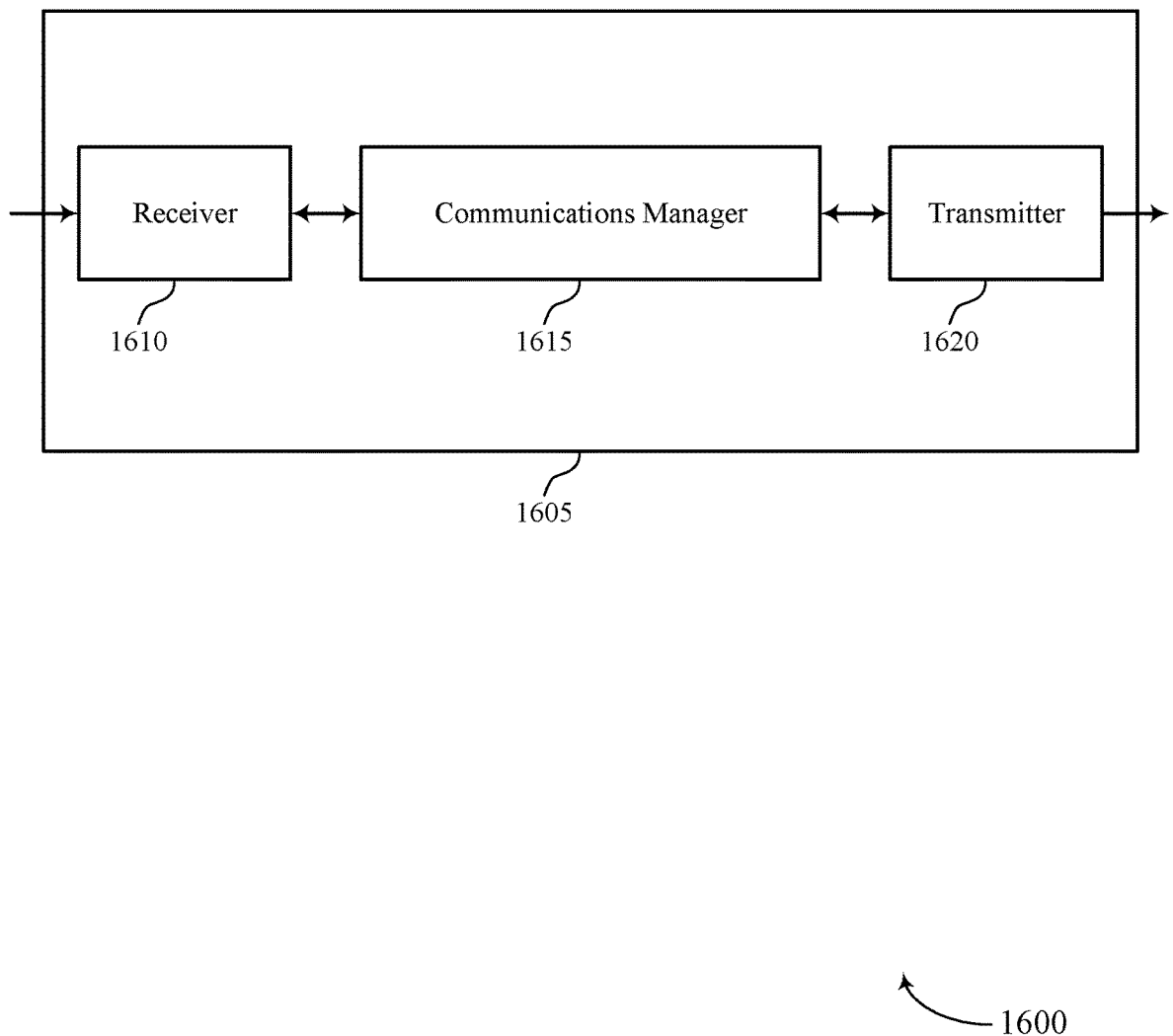
FIGS. 16 and 17 show block diagrams of devices that support downlink beam management using a configurable deflector in accordance with aspects of the present disclosure.

FIG. 16 shows a block diagram 1600 of a channel engineering device 1605 that supports downlink beam management using a configurable deflector in accordance with aspects of the present disclosure. The channel engineering device 1605 may be an example of aspects of a channel engineering device as described herein. The channel engineering device 1605 may include a receiver 1610, a communications manager 1615, and a transmitter 1620. The channel engineering device 1605 may also include a processor. Each of these components may be in communication with one another (e.g., via one or more buses).

The receiver 1610 may receive information such as packets, user data, or control information associated with various information channels (e.g., control channels, data channels, and information related to downlink beam management using a configurable deflector, etc.). Information may be passed on to other components of the channel engineering device 1605. The receiver 1610 may be an example of aspects of the transceiver 1920 described with reference to FIG. 19. The receiver 1610 may utilize a single antenna or a set of antennas.

The communications manager 1615 may receive, from a base station, control signaling indicating a set of configurations for deflecting a set of downlink reference signal transmissions received from the base station, deflect each downlink reference signal transmission of the set of downlink reference signal transmissions according to a corresponding configuration of the set of configurations, and receive, from the base station, an indication of a configuration of the set of configurations for the channel engineering device to use to deflect subsequent transmissions from the base station to a UE based on deflecting each downlink reference signal transmission from the base station. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the channel engineering device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
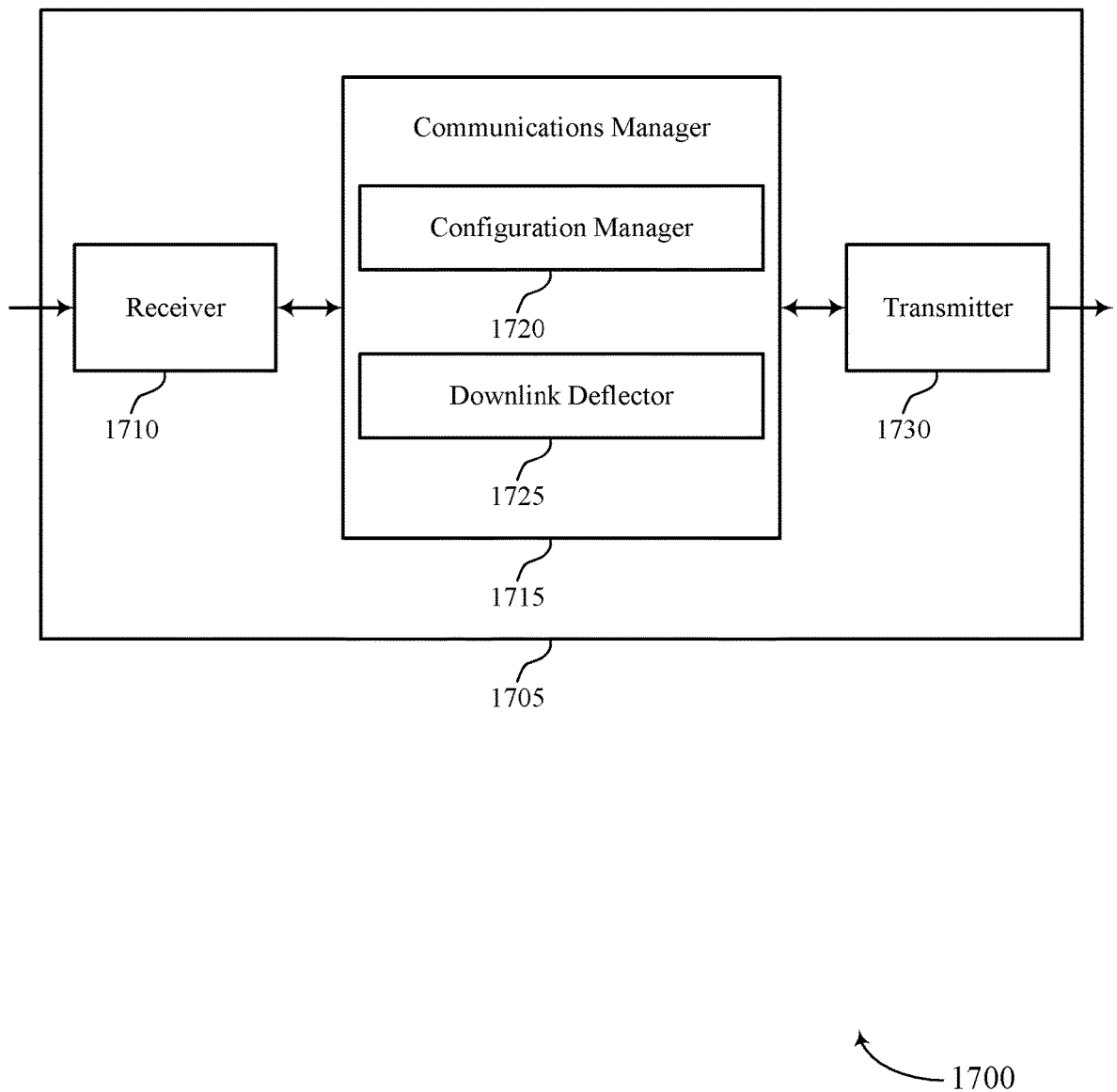

FIG. 17 shows a block diagram 1700 of a channel engineering device 1705 that supports downlink beam management using a configurable deflector in accordance with aspects of the present disclosure. The channel engineering device 1705 may be an example of aspects of a channel engineering device 1605 or a channel engineering device as described herein. The channel engineering device 1705 may include a receiver 1710, a communications manager 1715, and a transmitter 1730. The channel engineering device 1705 may also include a processor. Each of these components may be in communication with one another (e.g., via one or more buses).

The receiver 1710 may receive information such as packets, user data, or control information associated with various information channels (e.g., control channels, data channels, and information related to downlink beam management using a configurable deflector, etc.). Information may be passed on to other components of the channel engineering device 1705. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1615 as described herein. The communications manager 1715 may include a configuration manager 1720 and a downlink deflector 1725. The communications manager 1715 may be an example of aspects of the communications manager 1910 described herein.

The configuration manager 1720 may receive, from a base station, control signaling indicating a set of configurations for deflecting a set of downlink reference signal transmissions received from the base station. The downlink deflector 1725 may deflect each downlink reference signal transmission of the set of downlink reference signal transmissions according to a corresponding configuration of the set of configurations. The configuration manager 1720 may receive, from the base station, an indication of a configuration of the set of configurations for the channel engineering device to use to deflect subsequent transmissions from the base station to a UE based on deflecting each downlink reference signal transmission from the base station.

The transmitter 1735 may transmit signals generated by other components of the channel engineering device 1705. In some examples, the transmitter 1735 may be collocated with a receiver 1710 in a transceiver module. For example, the transmitter 1735 may be an example of aspects of the transceiver 1920 described with reference to FIG. 19. The transmitter 1735 may utilize a single antenna or a set of antennas.

Figure 18:
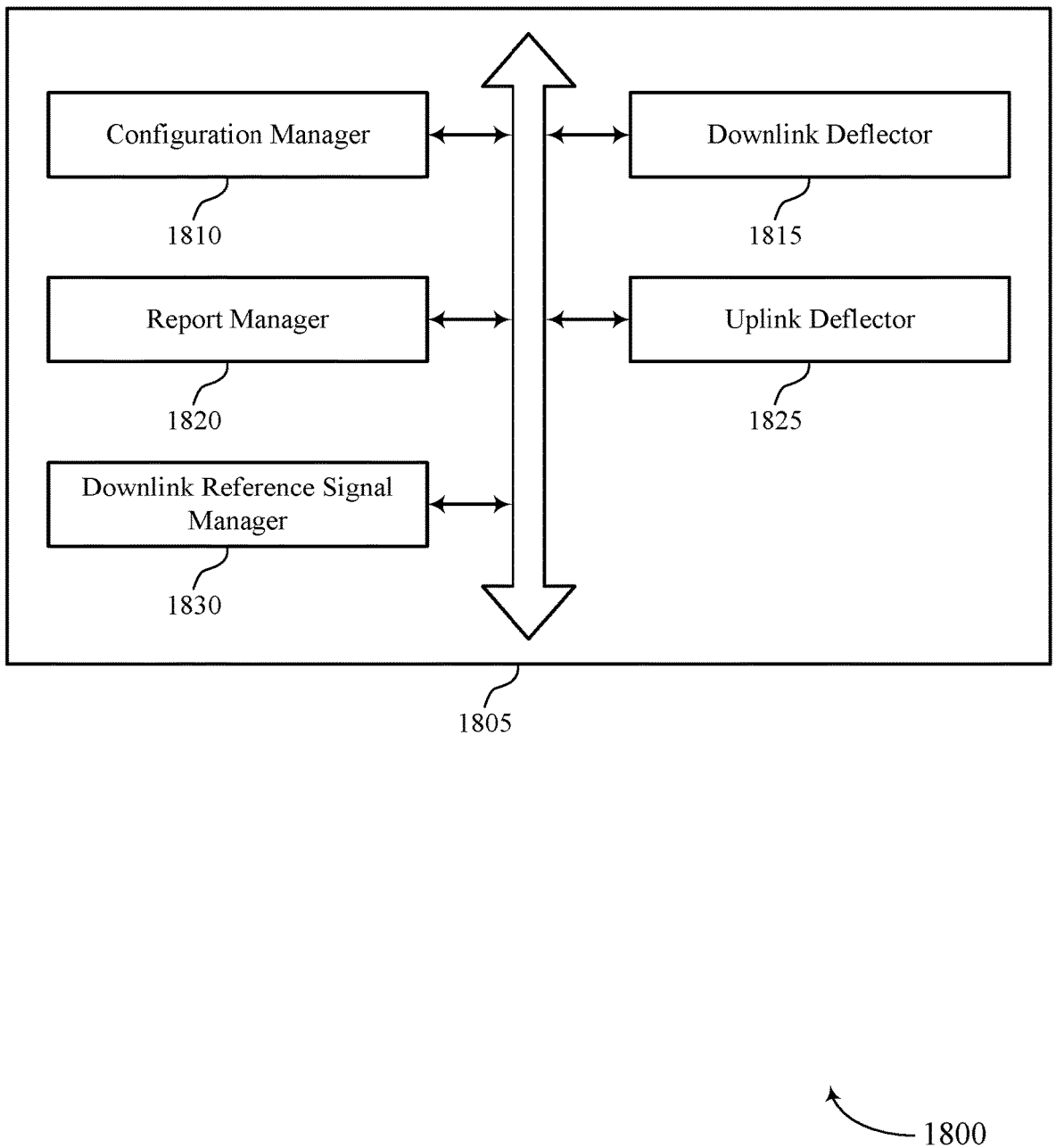
FIG. 18 shows a block diagram of a communications manager that supports downlink beam management using a configurable deflector in accordance with aspects of the present disclosure.

FIG. 18 shows a block diagram 1800 of a communications manager 1805 that supports downlink beam management using a configurable deflector in accordance with aspects of the present disclosure. The communications manager 1805 may be an example of aspects of a communications manager 1615, a communications manager 1715, or a communications manager 1910 described herein. The communications manager 1805 may include a configuration manager 1810, a downlink deflector 1815, a report manager 1820, an uplink deflector 1825, and a downlink reference signal manager 1830. Each of these modules may communicate, directly or indirectly, with one another (e.g., via one or more buses).

The configuration manager 1810 may receive, from a base station, control signaling indicating a set of configurations for deflecting a set of downlink reference signal transmissions received from the base station. The downlink deflector 1815 may deflect each downlink reference signal transmission of the set of downlink reference signal transmissions according to a corresponding configuration of the set of configurations. The configuration manager 1810 may receive, from the base station, an indication of a configuration of the set of configurations for the channel engineering device to use to deflect subsequent transmissions from the base station to a UE based on deflecting each downlink reference signal transmission from the base station.

The report manager 1820 may receive a report from the UE indicating the configuration of the set of configurations for the channel engineering device to use to deflect subsequent transmissions from the base station to the UE. The uplink deflector 1825 may deflect the report from the UE to the base station, where receiving the indication of the configuration from the base station is based on deflecting the report from the UE to the base station. In some examples, the report manager 1820 may receive the report from the UE on a resource corresponding to the configuration indicated by the base station for the channel engineering device to use to deflect subsequent transmissions to the UE. In some examples, the report manager 1820 may receive the report from the UE on a beam corresponding to the configuration indicated by the base station for the channel engineering device to use to deflect subsequent transmissions to the UE.

The downlink reference signal manager 1830 may receive the set of downlink reference signal transmissions from the base station on a single beam, where deflecting each downlink reference signal transmission of the set of downlink reference signal transmissions according to a corresponding configuration of the set of configurations includes beam sweeping the set of downlink reference signal transmissions. In some examples, the downlink reference signal manager 1830 may receive the set of downlink reference signal transmissions from the base station in consecutive symbols. In some cases, each of the set of configurations corresponds to a different angle at which the channel engineering device is to deflect a downlink reference signal transmission. In some cases, the set of downlink reference signal transmissions includes a set of channel state information reference signal transmissions.

Figure 19:
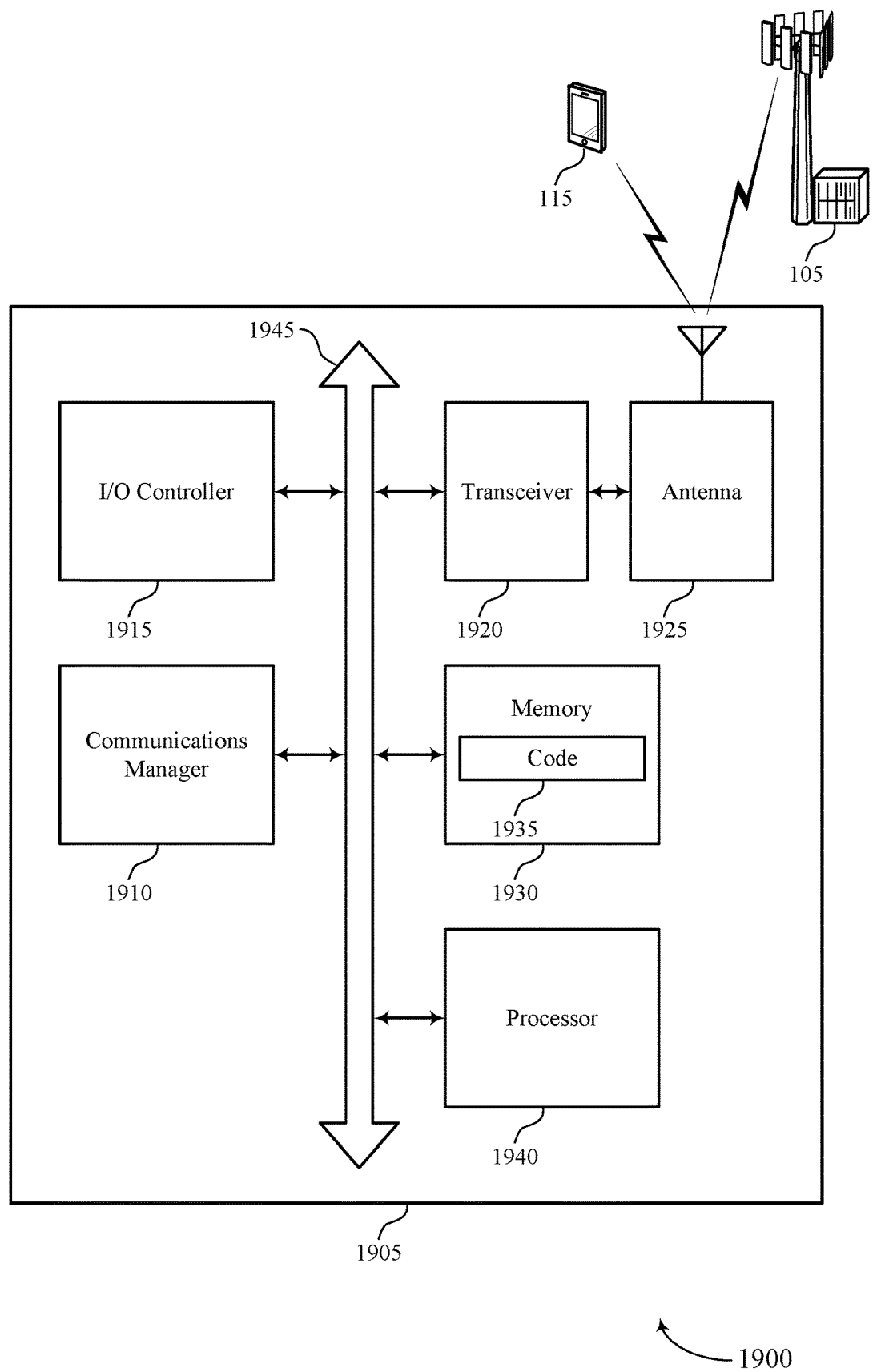
FIG. 19 shows a diagram of a system including a device that supports downlink beam management using a configurable deflector in accordance with aspects of the present disclosure.

FIG. 19 shows a diagram of a system 1900 including a channel engineering device 1905 that supports downlink beam management using a configurable deflector in accordance with aspects of the present disclosure. The channel engineering device 1905 may be an example of or include the components of channel engineering device 1605, channel engineering device 1705, or a channel engineering device as described herein. The channel engineering device 1905 may include components for bi-directional voice and data communications including components for transmitting and receiving communications, including a communications manager 1910, an I/O controller 1915, a transceiver 1920, an antenna 1925, memory 1930, and a processor 1940. These components may be in electronic communication via one or more buses (e.g., bus 1945).

The communications manager 1910 may receive, from a base station, control signaling indicating a set of configurations for deflecting a set of downlink reference signal transmissions received from the base station, deflect each downlink reference signal transmission of the set of downlink reference signal transmissions according to a corresponding configuration of the set of configurations, and receive, from the base station, an indication of a configuration of the set of configurations for the channel engineering device to use to deflect subsequent transmissions from the base station to a UE based on deflecting each downlink reference signal transmission from the base station.

The I/O controller 1915 may manage input and output signals for the channel engineering device 1905. The I/O controller 1915 may also manage peripherals not integrated into the channel engineering device 1905. In some cases, the I/O controller 1915 may represent a physical connection or port to an external peripheral. In some cases, the I/O controller 1915 may utilize an operating system such as iOS®, ANDROID®, MS-DOS®, MS-WINDOWS®, OS/2®, UNIX®, LINUX®, or another known operating system. In other cases, the I/O controller 1915 may represent or interact with a modem, a keyboard, a mouse, a touchscreen, or a similar device. In some cases, the I/O controller 1915 may be implemented as part of a processor. In some cases, a user may interact with the channel engineering device 1905 via the I/O controller 1915 or via hardware components controlled by the I/O controller 1915.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM and ROM. The memory 1930 may store computer-readable, computer-executable code 1935 including instructions that, when executed, cause the processor to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In other cases, a memory controller may be integrated into the processor 1940. The processor 1940 may be configured to execute computer-readable instructions stored in a memory (e.g., the memory 1930) to cause the channel engineering device 1905 to perform various functions (e.g., functions or tasks supporting downlink beam management using a configurable deflector).

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
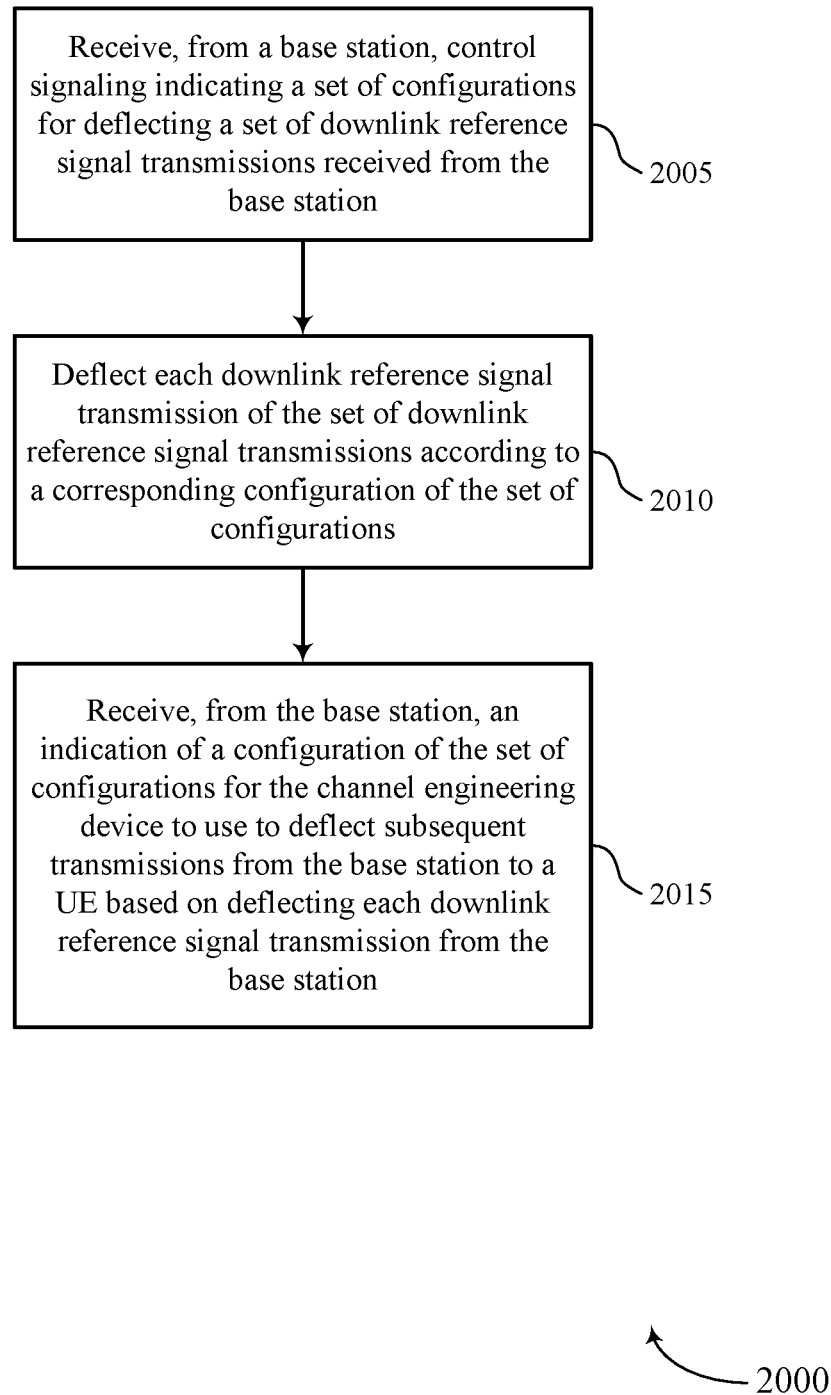
FIGS. 20 through 22 show flowcharts illustrating methods that support downlink beam management using a configurable deflector in accordance with aspects of the present disclosure.

FIG. 20 shows a flowchart illustrating a method 2000 that supports downlink beam management using a configurable deflector in accordance with aspects of the present disclosure. The operations of method 2000 may be implemented by a channel engineering device or its components as described herein. For example, the operations of method 2000 may be performed by a communications manager as described with reference to FIGS. 16 through 19. In some examples, a channel engineering device may execute a set of instructions to control the functional elements of the channel engineering device to perform the functions described below. Additionally, or alternatively, a channel engineering device may perform aspects of the functions described below using special-purpose hardware.

At 2005, the channel engineering device may receive, from a base station, control signaling indicating a set of configurations for deflecting a set of downlink reference signal transmissions received from the base station. The operations of 2005 may be performed according to the methods described herein. In some examples, aspects of the operations of 2005 may be performed by a configuration manager as described with reference to FIGS. 16 through 19.

At 2010, the channel engineering device may deflect each downlink reference signal transmission of the set of downlink reference signal transmissions according to a corresponding configuration of the set of configurations. The operations of 2010 may be performed according to the methods described herein. In some examples, aspects of the operations of 2010 may be performed by a downlink deflector as described with reference to FIGS. 16 through 19.

At 2015, the channel engineering device may receive, from the base station, an indication of a configuration of the set of configurations for the channel engineering device to use to deflect subsequent transmissions from the base station to a UE based on deflecting each downlink reference signal transmission from the base station. The operations of 2015 may be performed according to the methods described herein. In some examples, aspects of the operations of 2015 may be performed by a configuration manager as described with reference to FIGS. 16 through 19.

Figure 21:
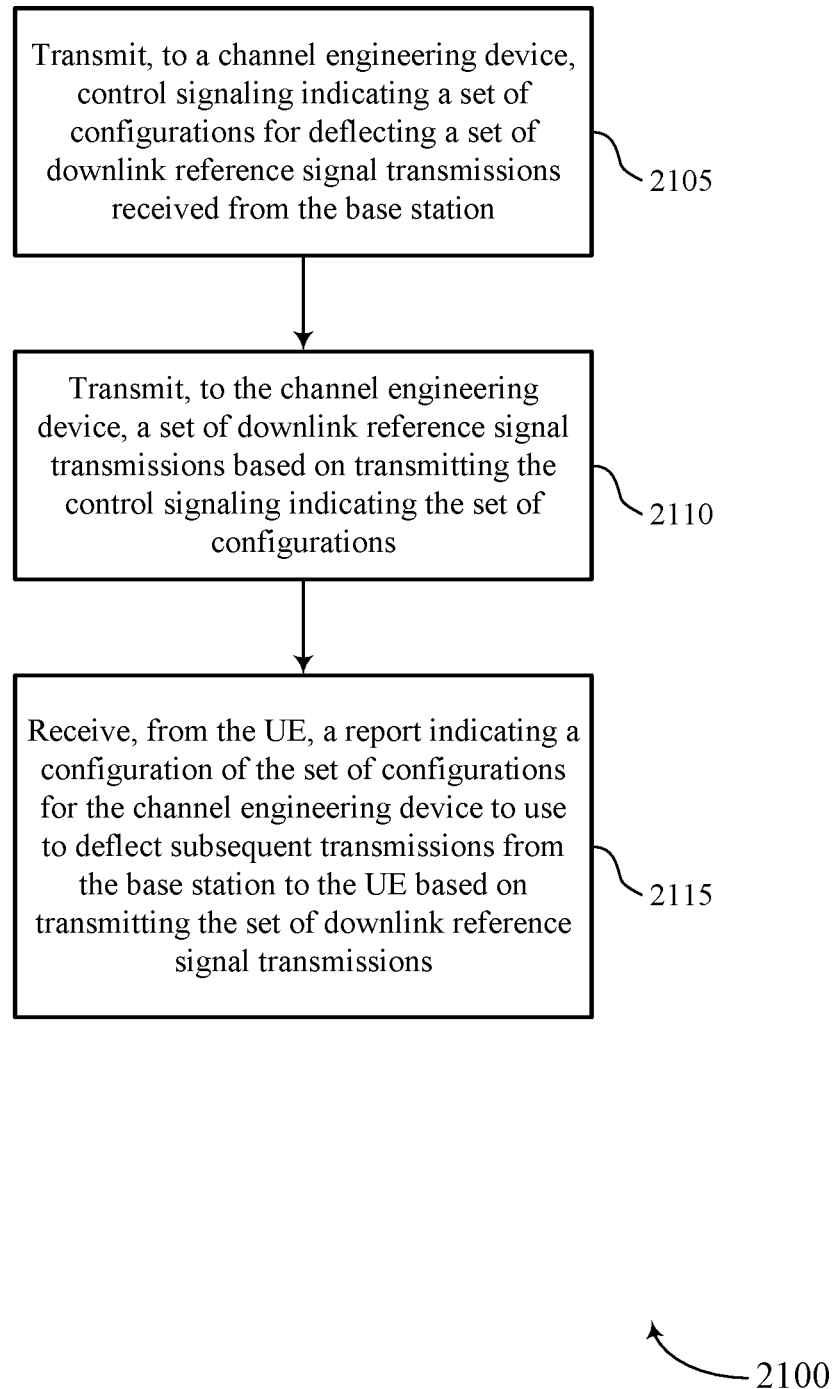

FIG. 21 shows a flowchart illustrating a method 2100 that supports downlink beam management using a configurable deflector in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 2105, the base station may transmit, to a channel engineering device, control signaling indicating a set of configurations for deflecting a set of downlink reference signal transmissions received from the base station. The operations of 2105 may be performed according to the methods described herein. In some examples, aspects of the operations of 2105 may be performed by a configuration manager as described with reference to FIGS. 12 through 15.

At 2110, the base station may transmit, to the channel engineering device, a set of downlink reference signal transmissions based on transmitting the control signaling indicating the set of configurations. The operations of 2110 may be performed according to the methods described herein. In some examples, aspects of the operations of 2110 may be performed by a downlink reference signal manager as described with reference to FIGS. 12 through 15.

At 2115, the base station may receive, from the UE, a report indicating a configuration of the set of configurations for the channel engineering device to use to deflect subsequent transmissions from the base station to the UE based on transmitting the set of downlink reference signal transmissions. The operations of 2115 may be performed according to the methods described herein. In some examples, aspects of the operations of 2115 may be performed by a report manager as described with reference to FIGS. 12 through 15.

Figure 22:
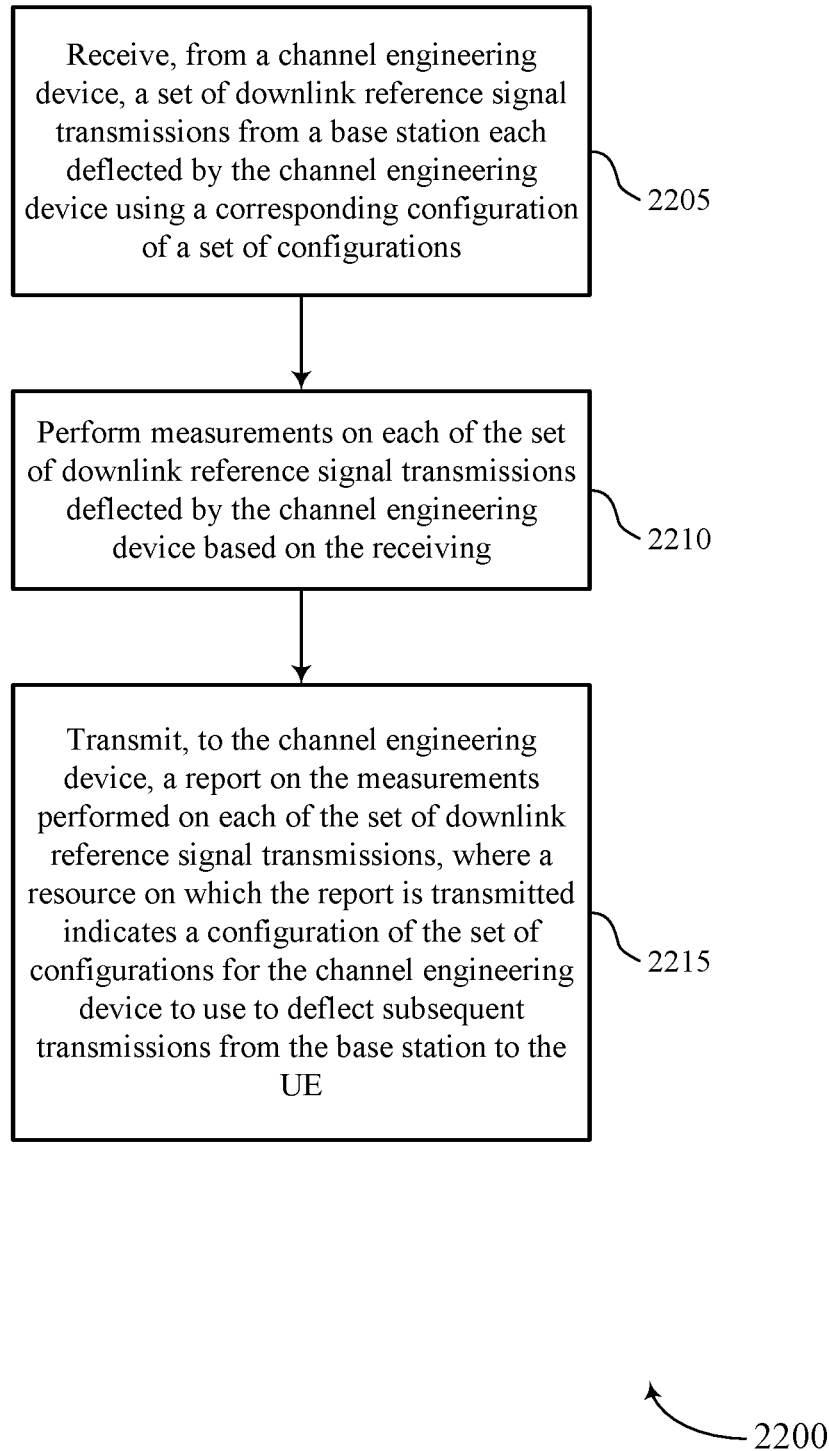

FIG. 22 shows a flowchart illustrating a method 2200 that supports downlink beam management using a configurable deflector in accordance with aspects of the present disclosure. The operations of method 2200 may be implemented by a UE 115 or its components as described herein. For example, the operations of method 2200 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 2205, the UE may receive, from a channel engineering device, a set of downlink reference signal transmissions from a base station each deflected by the channel engineering device using a corresponding configuration of a set of configurations. The operations of 2205 may be performed according to the methods described herein. In some examples, aspects of the operations of 2205 may be performed by a downlink reference signal manager as described with reference to FIGS. 8 through 11.

At 2210, the UE may perform measurements on each of the set of downlink reference signal transmissions deflected by the channel engineering device based on the receiving. The operations of 2210 may be performed according to the methods described herein. In some examples, aspects of the operations of 2210 may be performed by a measurement manager as described with reference to FIGS. 8 through 11.

At 2215, the UE may transmit, to the channel engineering device, a report on the measurements performed on each of the set of downlink reference signal transmissions, where a resource on which the report is transmitted indicates a configuration of the set of configurations for the channel engineering device to use to deflect subsequent transmissions from the base station to the UE. The operations of 2215 may be performed according to the methods described herein. In some examples, aspects of the operations of 2215 may be performed by a report manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a channel engineering device, comprising: receiving, from a base station, control signaling indicating a plurality of configurations for deflecting a set of downlink reference signal transmissions received from the base station; deflecting each downlink reference signal transmission of the set of downlink reference signal transmissions according to a corresponding configuration of the plurality of configurations; and receiving, from the base station, an indication of a configuration of the plurality of configurations for the channel engineering device to use to deflect subsequent transmissions from the base station to a UE based at least in part on deflecting each downlink reference signal transmission from the base station.

Aspect 2: The method of aspect 1, further comprising: receiving a report from the UE indicating the configuration of the plurality of configurations for the channel engineering device to use to deflect subsequent transmissions from the base station to the UE; and deflecting the report from the UE to the base station, wherein receiving the indication of the configuration from the base station is based at least in part on deflecting the report from the UE to the base station.

Aspect 3: The method of aspect 2, wherein receiving the report from the UE comprises: receiving the report from the UE on a resource corresponding to the configuration indicated by the base station for the channel engineering device to use to deflect subsequent transmissions to the UE.

Aspect 4: The method of any of aspects 2 through 3, wherein receiving the report from the UE comprises: receiving the report from the UE on a beam corresponding to the configuration indicated by the base station for the channel engineering device to use to deflect subsequent transmissions to the UE.

Aspect 5: The method of any of aspects 1 through 4, further comprising: receiving the set of downlink reference signal transmissions from the base station on a single beam, wherein deflecting each downlink reference signal transmission of the set of downlink reference signal transmissions according to the corresponding configuration of the plurality of configurations comprises beam sweeping the set of downlink reference signal transmissions.

Aspect 6: The method of aspect 5, wherein receiving the set of downlink reference signal transmissions from the base station on the single beam comprises: receiving the set of downlink reference signal transmissions from the base station in consecutive symbols.

Aspect 7: The method of any of aspects 1 through 6, wherein each of the plurality of configurations corresponds to a different angle at which the channel engineering device is to deflect a downlink reference signal transmission.

Aspect 8: The method of any of aspects 1 through 7, wherein the set of downlink reference signal transmissions comprises a set of channel state information reference signal transmissions.

Aspect 9: A method for wireless communication at a base station, comprising: transmitting, to a channel engineering device, control signaling indicating a plurality of configurations for deflecting a set of downlink reference signal transmissions received from the base station; transmitting, to the channel engineering device, the set of downlink reference signal transmissions based at least in part on transmitting the control signaling indicating the plurality of configurations; and receiving, from the UE, a report indicating a configuration of the plurality of configurations for the channel engineering device to use to deflect subsequent transmissions from the base station to the UE based at least in part on transmitting the set of downlink reference signal transmissions.

Aspect 10: The method of aspect 9, further comprising: transmitting, to the channel engineering device, an indication of the configuration of the plurality of configurations for the channel engineering device to use to deflect subsequent transmissions from the base station to the UE based at least in part on receiving the report from the UE.

Aspect 11: The method of any of aspects 9 through 10, wherein receiving the report from the UE indicating the configuration for the channel engineering device to use to deflect subsequent transmissions from the base station to the UE comprises: receiving the report from the UE on a resource corresponding to the configuration for the channel engineering device to use to deflect subsequent transmissions from the base station to the UE.

Aspect 12: The method of aspect 11, further comprising: transmitting, to the UE, an indication of a plurality of resources each allocated for transmitting the report, wherein each resource is allocated to indicate a different configuration of the plurality of configurations for the channel engineering device to use to deflect subsequent transmissions from the base station to the UE.

Aspect 13: The method of any of aspects 9 through 12, wherein transmitting the set of downlink reference signal transmissions comprises: transmitting the set of downlink reference signal transmissions on a single beam for deflection by the channel engineering device to the UE in a beam sweep using the plurality of configurations.

Aspect 14: The method of aspect 13, wherein transmitting the set of downlink reference signal transmissions on the single beam comprises: transmitting the set of downlink reference signal transmissions in consecutive symbols.

Aspect 15: The method of any of aspects 9 through 14, wherein the set of downlink reference signal transmissions comprises a set of channel state information reference signal transmissions.

Aspect 16: A method for wireless communication at a UE, comprising: receiving, from a channel engineering device, a set of downlink reference signal transmissions from a base station each deflected by the channel engineering device using a corresponding configuration of a plurality of configurations; performing measurements on each of the set of downlink reference signal transmissions deflected by the channel engineering device based at least in part on the receiving; and transmitting, to the channel engineering device, a report on the measurements performed on each of the set of downlink reference signal transmissions, wherein a resource on which the report is transmitted indicates a configuration of the plurality of configurations for the channel engineering device to use to deflect subsequent transmissions from the base station to the UE.

Aspect 17: The method of aspect 16, further comprising: receiving, from the base station, an indication of a plurality of resources allocated for transmitting the report, wherein each resource is allocated to indicate a different configuration of the plurality of configurations for the channel engineering device to use to deflect subsequent transmissions from the base station to the UE.

Aspect 18: The method of any of aspects 16 through 17, wherein transmitting the report comprises: transmitting the report on a beam corresponding to the configuration for the channel engineering device to use to deflect subsequent transmissions to the UE.

Aspect 19: The method of any of aspects 16 through 18, wherein the measurements comprise reference signal received power measurements, reference signal received quality measurements, signal-to-interference-plus-noise ratio measurements, or a combination thereof.

Aspect 20: The method of any of aspects 16 through 19, wherein the set of downlink reference signal transmissions comprises a set of channel state information reference signal transmissions.

Aspect 21: An apparatus for wireless communication at a channel engineering device, comprising a processor; memory coupled with the processor; and instructions stored in the memory and executable by the processor to cause the apparatus to perform a method of any of aspects 1 through 8.

Aspect 22: An apparatus for wireless communication at a channel engineering device, comprising at least one means for performing a method of any of aspects 1 through 8.

Aspect 23: A non-transitory computer-readable medium storing code for wireless communication at a channel engineering device, the code comprising instructions executable by a processor to perform a method of any of aspects 1 through 8.

Aspect 24: An apparatus for wireless communication at a base station, comprising a processor; memory coupled with the processor; and instructions stored in the memory and executable by the processor to cause the apparatus to perform a method of any of aspects 9 through 15.

Aspect 25: An apparatus for wireless communication at a base station, comprising at least one means for performing a method of any of aspects 9 through 15.

Aspect 26: A non-transitory computer-readable medium storing code for wireless communication at a base station, the code comprising instructions executable by a processor to perform a method of any of aspects 9 through 15.

Aspect 27: An apparatus for wireless communication at a UE, comprising a processor; memory coupled with the processor; and instructions stored in the memory and executable by the processor to cause the apparatus to perform a method of any of aspects 16 through 20.

Aspect 28: An apparatus for wireless communication at a UE, comprising at least one means for performing a method of any of aspects 16 through 20.

Aspect 29: A non-transitory computer-readable medium storing code for wireless communication at a UE, the code comprising instructions executable by a processor to perform a method of any of aspects 16 through 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a channel engineering device, comprising:
   receiving, from a base station, control signaling indicating a plurality of configurations for deflecting a set of downlink reference signal transmissions received from the base station;

deflecting each downlink reference signal transmission of the set of downlink reference signal transmissions according to a corresponding configuration of the plurality of configurations; and receiving, from the base station, an indication of a configuration of the plurality of configurations for the channel engineering device to use to deflect subsequent transmissions from the base station to a user equipment (UE) based at least in part on deflecting each downlink reference signal transmission from the base station.

2. The method of claim 1, further comprising:
receiving a report from the UE indicating the configuration of the plurality of configurations for the channel engineering device to use to deflect subsequent transmissions from the base station to the UE; and
deflecting the report from the UE to the base station, wherein receiving the indication of the configuration from the base station is based at least in part on deflecting the report from the UE to the base station.

3. The method of claim 2, wherein receiving the report from the UE comprises:
receiving the report from the UE on a resource corresponding to the configuration indicated by the base station for the channel engineering device to use to deflect subsequent transmissions to the UE.

4. The method of claim 2, wherein receiving the report from the UE comprises:
receiving the report from the UE on a beam corresponding to the configuration indicated by the base station for the channel engineering device to use to deflect subsequent transmissions to the UE.

5. The method of claim 1, further comprising:
receiving the set of downlink reference signal transmissions from the base station on a single beam, wherein deflecting each downlink reference signal transmission of the set of downlink reference signal transmissions according to the corresponding configuration of the plurality of configurations comprises beam sweeping the set of downlink reference signal transmissions.

6. The method of claim 5, wherein receiving the set of downlink reference signal transmissions from the base station on the single beam comprises:
receiving the set of downlink reference signal transmissions from the base station in consecutive symbols.

7. The method of claim 1, wherein each of the plurality of configurations corresponds to a different angle at which the channel engineering device is to deflect a downlink reference signal transmission.

8. The method of claim 1, wherein the set of downlink reference signal transmissions comprises a set of channel state information reference signal transmissions.

9. A method for wireless communication at a base station, comprising:
transmitting, to a channel engineering device, control signaling indicating a plurality of configurations for deflecting a set of downlink reference signal transmissions received from the base station;
transmitting, to the channel engineering device, the set of downlink reference signal transmissions based at least in part on transmitting the control signaling indicating the plurality of configurations; and
receiving, from the UE, a report indicating a configuration of the plurality of configurations for the channel engineering device to use to deflect subsequent transmissions from the base station to the UE based at least in part on transmitting the set of downlink reference signal transmissions.

10. The method of claim 9, further comprising:
transmitting, to the channel engineering device, an indication of the configuration of the plurality of configurations for the channel engineering device to use to deflect subsequent transmissions from the base station to the UE based at least in part on receiving the report from the UE.

11. The method of claim 9, wherein receiving the report from the UE indicating the configuration for the channel engineering device to use to deflect subsequent transmissions from the base station to the UE comprises:
receiving the report from the UE on a resource corresponding to the configuration for the channel engineering device to use to deflect subsequent transmissions from the base station to the UE.

12. The method of claim 11, further comprising:
transmitting, to the UE, an indication of a plurality of resources each allocated for transmitting the report, wherein each resource is allocated to indicate a different configuration of the plurality of configurations for the channel engineering device to use to deflect subsequent transmissions from the base station to the UE.

13. The method of claim 9, wherein transmitting the set of downlink reference signal transmissions comprises:
transmitting the set of downlink reference signal transmissions on a single beam for deflection by the channel engineering device to the UE in a beam sweep using the plurality of configurations.

14. The method of claim 13, wherein transmitting the set of downlink reference signal transmissions on the single beam comprises:
transmitting the set of downlink reference signal transmissions in consecutive symbols.

15. The method of claim 9, wherein the set of downlink reference signal transmissions comprises a set of channel state information reference signal transmissions.

16. A method for wireless communication at a user equipment (UE), comprising:
receiving, from a channel engineering device, a set of downlink reference signal transmissions from a base station each deflected by the channel engineering device using a corresponding configuration of a plurality of configurations;
performing measurements on each of the set of downlink reference signal transmissions deflected by the channel engineering device based at least in part on the receiving; and
transmitting, to the channel engineering device, a report on the measurements performed on each of the set of downlink reference signal transmissions, wherein a resource on which the report is transmitted indicates a configuration of the plurality of configurations for the channel engineering device to use to deflect subsequent transmissions from the base station to the UE.

17. The method of claim 16, further comprising:
receiving, from the base station, an indication of a plurality of resources allocated for transmitting the report, wherein each resource is allocated to indicate a different configuration of the plurality of configurations for the channel engineering device to use to deflect subsequent transmissions from the base station to the UE.

18. The method of claim 16, wherein transmitting the report comprises:
transmitting the report on a beam corresponding to the configuration for the channel engineering device to use to deflect subsequent transmissions to the UE.

19. The method of claim 16, wherein the measurements comprise reference signal received power measurements, reference signal received quality measurements, signal-to-interference-plus-noise ratio measurements, or a combination thereof.

20. The method of claim 16, wherein the set of downlink reference signal transmissions comprises a set of channel state information reference signal transmissions.

21. An apparatus for wireless communication at a channel engineering device, comprising:
a processor;
memory coupled with the processor; and
instructions stored in the memory and executable by the processor to cause the apparatus to:
receive, from a base station, control signaling indicating a plurality of configurations for deflecting a set of downlink reference signal transmissions received from the base station;
deflect each downlink reference signal transmission of the set of downlink reference signal transmissions according to a corresponding configuration of the plurality of configurations; and
receive, from the base station, an indication of a configuration of the plurality of configurations for the channel engineering device to use to deflect subsequent transmissions from the base station to a user equipment (UE) based at least in part on deflecting each downlink reference signal transmission from the base station.

22. The apparatus of claim 21, wherein the instructions are further executable by the processor to cause the apparatus to:
receive a report from the UE indicating the configuration of the plurality of configurations for the channel engineering device to use to deflect subsequent transmissions from the base station to the UE; and
deflect the report from the UE to the base station, wherein receiving the indication of the configuration from the base station is based at least in part on deflecting the report from the UE to the base station.

23. The apparatus of claim 22, wherein the instructions to receive the report from the UE are executable by the processor to cause the apparatus to:
receive the report from the UE on a resource corresponding to the configuration indicated by the base station for the channel engineering device to use to deflect subsequent transmissions to the UE.

24. The apparatus of claim 22, wherein the instructions to receive the report from the UE are executable by the processor to cause the apparatus to:
receive the report from the UE on a beam corresponding to the configuration indicated by the base station for the channel engineering device to use to deflect subsequent transmissions to the UE.

25. The apparatus of claim 21, wherein the instructions are further executable by the processor to cause the apparatus to:
receive the set of downlink reference signal transmissions from the base station on a single beam, wherein deflecting each downlink reference signal transmission of the set of downlink reference signal transmissions according to the corresponding configuration of the plurality of configurations comprises beam sweeping the set of downlink reference signal transmissions.

26. The apparatus of claim 25, wherein the instructions to receive the set of downlink reference signal transmissions from the base station on the single beam are executable by the processor to cause the apparatus to:
receive the set of downlink reference signal transmissions from the base station in consecutive symbols.

27. The apparatus of claim 21, wherein each of the plurality of configurations corresponds to a different angle at which the channel engineering device is to deflect a downlink reference signal transmission.

28. The apparatus of claim 21, wherein the set of downlink reference signal transmissions comprises a set of channel state information reference signal transmissions.

* * * * *